(12) United States Patent
Ninomiya et al.

(10) Patent No.: US 8,166,737 B2
(45) Date of Patent: May 1, 2012

(54) WALK-BEHIND LAWNMOWER HEIGHT ADJUSTING MECHANISM

(75) Inventors: Yusuke Ninomiya, Wako (JP); Tetsuo Iida, Wako (JP); Nobuyuki Hirose, Wako (JP); Mai Ohba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/074,451

(22) Filed: Mar. 29, 2011

(65) Prior Publication Data
US 2011/0239612 A1 Oct. 6, 2011

(30) Foreign Application Priority Data

Mar. 30, 2010 (JP) ................................. 2010-079262

(51) Int. Cl.
*A01D 34/00* (2006.01)
(52) U.S. Cl. ........................................................ 56/17.2
(58) Field of Classification Search .................. 56/17.2, 56/17.1, 320.2, DIG. 2; 280/43.13
See application file for complete search history.

(56) References Cited

U.S. PATENT DOCUMENTS

| | | | | |
|---|---|---|---|---|
| 2,945,338 | A * | 7/1960 | Burrows et al. | 56/17.2 |
| 3,269,100 | A * | 8/1966 | Smith | 56/17.2 |
| 3,292,351 | A * | 12/1966 | Larson et al. | 56/17.2 |
| 3,357,715 | A * | 12/1967 | Plamper et al. | 280/43.13 |
| 3,972,160 | A * | 8/1976 | Boswell | 56/255 |
| 4,006,580 | A * | 2/1977 | Kalleicher | 56/17.2 |
| 4,167,093 | A * | 9/1979 | Pfeiffer et al. | 56/17.2 |
| 4,422,283 | A * | 12/1983 | Scanland | 56/320.2 |
| 4,835,952 | A * | 6/1989 | McLane | 56/17.2 |
| 4,905,463 | A * | 3/1990 | Eilles | 56/17.2 |
| 5,526,633 | A * | 6/1996 | Strong et al. | 56/17.2 |
| 5,749,209 | A * | 5/1998 | Thomason | 56/17.2 |
| 6,378,280 | B1 * | 4/2002 | Bone et al. | 56/17.1 |
| 6,606,845 | B1 * | 8/2003 | Spies | 56/16.7 |

FOREIGN PATENT DOCUMENTS

| | | |
|---|---|---|
| DE | 88 11 157 U1 | 4/1989 |
| EP | 1637023 A2 | 3/2006 |
| GB | 2328359 A | 2/1999 |
| JP | S58-129908 A | 8/1983 |
| JP | 06-296414 A | 10/1994 |
| JP | 2530377 Y2 | 3/1997 |
| JP | 2599658 B2 | 4/1997 |

\* cited by examiner

*Primary Examiner* — Arpad Fabian-Kovacs
(74) *Attorney, Agent, or Firm* — Carrier Blackman & Associates, P.C.; Joseph P. Carrier; William D. Blackman

(57) ABSTRACT

A walk-behind lawnmower having a height adjusting mechanism for adjusting the height of a housing above the ground. The height adjusting mechanism includes: a front wheel supporting member and a rear wheel supporting member that are attached to the housing so as to be capable of swinging up and down; a linking member for linking the front and rear wheel supporting members so as to be capable of concerted motion; and a locking mechanism for restricting and releasing displacement of the linking member in the forward-and-backward direction. The locking mechanism includes: a plurality of locking grooves arranged in a row from front to rear on the linking member; a locking pin capable of selectively interlocking with one of the locking grooves; a pin-guiding part for guiding the locking pin to be capable of entering into and retracting from one of the locking grooves; and an operating member for sliding and operating the locking pin.

17 Claims, 20 Drawing Sheets

WALK-BEHIND LAWNMOWER HEIGHT ADJUSTING MECHANISM

FIELD OF THE INVENTION

The present invention relates generally to a walk-behind lawnmower and, more particularly, to a technology for improving a mowing-height adjusting mechanism.

BACKGROUND OF THE INVENTION

A walk-behind lawnmower includes: a housing having front wheels and back wheels and being open at the bottom; a blade rotatably housed within the housing; and an operating handle for the operator to steer while walking. This walk-behind lawnmower can proceed while using the blade to cut grass and is appropriate for cutting grass in household yards or other narrow areas.

A walk-behind lawnmower of such description is provided with a height adjusting mechanism that is capable of adjusting the height of the housing and the blade in relation to the ground in order to regulate the mowing height. The height adjusting mechanism adjusts the heights of the front and rear wheels relative to the housing. Two adjustment systems are used. The first adjustment system involves separately adjusting the heights of the front and rear wheels relative to the housing. The second adjustment system involves adjusting the heights of the front and rear wheels relative to the housing in a linked fashion. Since the front and rear wheels are linked in the second adjustment system, height can be adjusted using a single action, the adjustment operation is simple, and this system is therefore widely used. Example walk-behind lawnmowers provided with a height adjusting mechanism of the second system are disclosed in Japanese Utility Model Registration No. 2530377, Japanese Patent No. 2599658, Japanese Patent Application Laid-Open Publication No. H06-296414, and Japanese Patent Application Laid-Open Publication No. S58-129908.

The height adjusting mechanism of the walk-behind lawnmowers disclosed in Japanese Utility Model Registration No. 2530377 and Japanese Patent No. 2599658 is provided with a front wheel-supporting member and a rear wheel-supporting member that are linked to the front and rear of the housing so as to allow up-and-down swinging; a height-adjusting plate that is linked to the upper part of the housing so as to allow up-and-down swinging; a front rod and a rear rod that convey the swinging motion of the height-adjusting plate to the front and rear wheel-supporting members; and a locking mechanism for restricting the swinging motion of the height-adjusting plate. The front wheel-supporting member supports the front wheels, and the rear wheel-supporting member supports the rear wheels.

The locking mechanism is composed of a plurality of locking grooves that is formed on the height-adjusting plate; a locking pin that can selectively interlock with one of the locking grooves; and an operating knob that is operated so as to insert and retract the locking pin in relation to one of the locking grooves. The operating knob is capable of swinging up and down.

When the operator uses the finger of one hand to swing the operating knob upward, the locking pin separates from the locking groove, and the height-adjusting plate can therefore swing up and down. The operator uses the other hand to move the housing up or down while holding the operating knob in the same position, whereby the height of the housing and the blade can be adjusted. When the hand is taken away from the operating knob after adjustment, the operating knob automatically returns to the original position, whereby swinging of the height-adjusting plate is restricted.

The height adjusting mechanism of the walk-behind lawnmower disclosed in Japanese Patent Application Laid-Open Publication No. H06-296414 is composed of a front wheel-supporting member and a rear wheel-supporting member that are linked to the front and rear of the housing so as to allow swinging up and down; a linking member for linking together the front and rear wheel-supporting members so as to allow concerted motion; and a locking mechanism for restricting the swinging motion of the rear wheel-supporting member. The locking mechanism is composed of a plurality of locking grooves formed on the rear wheel-supporting member; and an operating lever that can selectively interlock with one of the locking grooves. The operating lever extends upward from a lateral part of the housing and is capable of swinging in the widthwise direction of the mower.

When the operator uses one hand to swing the operating lever toward the widthwise center of the mower, the operating lever is separated from the locking groove, and the rear wheel-supporting member can therefore swing up and down. The operator uses the other hand to move the housing up or down while holding the operating lever in the same position, whereby the height of the housing and the blade can be adjusted. The operating lever is returned to the original position after adjustment, whereby swinging of the rear wheel-supporting member is restricted.

The height adjusting mechanism of the walk-behind lawnmower disclosed in Japanese Patent Application Laid-Open Publication No. S58-129908 is composed of parallel links for suspending the housing on a frame that includes front wheels and rear wheels; and a locking mechanism for restricting forward or backward displacement of the parallel links.

The locking mechanism is composed of a plate that extends upward from the frame; a plurality of locking grooves formed in a row from front to rear on the upper end of the plate; a locking pin that can selectively interlock with one of the locking grooves; and an operating lever that is operated so as to insert and retract the locking pin with relation to one of the locking grooves. The operating lever extends upward from the upper surface of the housing and can swing in a forward-and-backward direction. The locking pin is attached to the operating lever so as to be capable of relative displacement in the longitudinal direction of the lever. The parallel links are linked to the operating lever so as to allow concerted motion.

When the operator swings the operating lever in the forward-and-backward direction, the parallel links are displaced in the forward-and-backward direction, whereby the housing is moved up or down. The locking pin in this instance swings in the forward-and-backward direction along with the operating lever and sequentially enters into and retracts from the locking grooves according to the swinging motion. The up and down movement of the housing is restricted in states in which the locking pin is interlocked with one of the locking grooves.

The height adjusting mechanism of the second system has a comparatively complex configuration, as is made clear from the technology disclosed in Japanese Utility Model Registration No. 2530377, Japanese Patent No. 2599658, Japanese Patent Application Laid-Open Publication No. H06-296414, and Japanese Patent Application Laid-Open Publication No. S58-129908. Despite such complex configurations, greater operational reliability and durability is needed to resist the effects of the dust produced during lawn mowing. The operator may also frequently adjust the height of mowing according to the lawn-mowing conditions, and greater operability is therefore also needed for the height adjusting mechanism.

SUMMARY OF THE INVENTION

It is therefore an object of the present invention to provide a walk-behind lawnmower in which the operational reliability, durability and operability of the height adjusting mechanism can be increased.

According to an aspect of the present invention, there is provided a walk-behind lawnmower designed to travel under motor power or manpower while cutting grass, which walk-behind lawnmower comprises: a housing; a blade, housed within the housing, for cutting away the grass; and a height adjusting mechanism for adjusting a height of the housing and the blade with respect to the ground, wherein the height adjusting mechanism includes: front wheel supporting members, linked vertically swingably to a front part of the housing, for supporting front wheels; rear wheel supporting members, linked vertically swingably to a rear part of the housing, for supporting rear wheels; a linking member for linking together the front wheel supporting members and the rear wheel supporting members so as to enable the front wheel supporting members and the rear wheel supporting members to move in unison, the linking member being displaceable in a forward-and-backward direction and in a vertical direction in correspondence with swinging movements of the front wheel supporting member and the rear wheel supporting member; and a locking mechanism for restricting and releasing the displacement of the linking member in the forward-and-backward direction, the locking mechanism including: a plurality of locking grooves formed in a row from front to rear on the linking member; a locking pin capable of selectively interlocking with one of the locking grooves; a pin-guiding part, provided to the housing, for slide-guiding the locking pin in an entry-retraction direction with respect to one of the grooves; and an operating member, provided to the housing, for slide-operating the locking pin.

In the present invention, when the operating member causes the locking pin to slide, the locking pin is guided by the pin-guiding part and enters into and retracts from one of the locking grooves. In other words, displacement of the linking member in the forward-and-backward direction is restricted in a state in which the locking pin is interlocked with one of the locking grooves. Swinging motion of the front and rear wheel-supporting members is therefore restricted, and the height of the housing and the blade in relation to the ground therefore cannot be adjusted. The operator thereafter uses the operating member to slide the locking pin, and displacement of the linking member in the forward-and-backward direction is permitted upon separation from the locking groove. Since swinging of the front and rear wheel-supporting members is therefore permitted, the height of the housing and the blade in relation to the ground can be adjusted. After adjusting the height, the locking pin is operated once again so as to interlock with one of the locking grooves, whereby displacement of the linking member in the forward-and-backward direction is restricted.

The pin-guiding part thus slidably guides the locking pin only in a direction for entering into or retracting from one of the locking grooves aligned in a row from front to rear on the linking member. The locking pin can therefore be made to reliably enter into and retract from one of the locking grooves irrespective of the operational state of the operating member or the state of displacement of the linking member.

Since the pin-guiding part slidably guides the locking pin only in a direction for entering into or retracting from one of the locking grooves, as described above, the array pitch and the groove width of the locking grooves can be readily set to optimal values. Setting the array pitch and the groove width to optimal values allows the locking pin to be reliably inserted into and retracted from the locking grooves. As a result, the operational reliability of the height adjusting mechanism can be increased.

The array pitch and the groove width are set to optimal values so as to resist the effects of dust, whereby the durability of the locking grooves and the locking pin can be increased. As a result, the durability of the height adjusting mechanism can be increased.

The pin-guiding part can slidably guide the locking pin in a consistent manner. The locking pin can be made to slide irrespective of the operational format (pushing, sliding, or the like) of the operating member. The operating member can therefore be selected to have high operability according to the type and size of the walk-behind lawnmower. As a result, the operability of the height adjusting mechanism can be increased.

It is preferable that each of the locking grooves comprise a U-shaped groove having an upper end open so as to slope downward from an upper-end surface of the linking member, and the upper-end surface of the linking member be an arc surface formed in an arcuate shape across all of a portion at which the upper ends of the locking grooves are positioned, the arcuate shape corresponding to a displacement track (Lt) of the linking member in the forward-and-backward direction and the up and down direction.

Each of the locking grooves comprises a U-shaped groove having an upper end open so as to slope downward from an upper-end surface of the linking member. The locking pin that is interlocked with the locking groove therefore does not readily separate therefrom due to the vibration produced when the cut grass (grass cut by the blade) adhering to the lawnmower is knocked loose.

As described above, the linking member links together and allows associated motion of the front and rear wheel-supporting members, which are linked to the housing so as to be capable of swinging up and down. The linking member, therefore, is also displaced in the forward-and-backward direction and in the up and down direction according to the swinging up and down of the front and rear wheel-supporting members. The locking grooves aligned in a row from front to rear on the linking member is therefore displaced in the up and down direction along with the linking member. The amount of sliding of the locking pin that is operated by the operating member has no relationship with the amount of displacement in the up and down direction of the locking grooves. The position at which the locking pin interlocks with any of the locking grooves can therefore be made less deep according to the amount of displacement in the up and down direction of the locking grooves.

In contrast, in the invention according to the second aspect, the upper end surface of the linking member is an arcuate surface describing an arcuate shape over the entirety of the portion at which the upper ends of the locking grooves are positioned, the arcuate shape corresponding to the displacement trajectory in the forward-and-backward direction and in the up and down direction of the linking member. The locking pin can therefore be adequately interlocked with all of the locking grooves even when the upper ends of the locking grooves are displaced in the forward-and-backward direction and in the up and down direction. The locking pin that is interlocked with the locking groove therefore does not readily come loose, and the operational reliability of the height adjusting mechanism can accordingly be further increased.

In a preferred form, at least one of a front surface on an edge forming a front-end one of the locking grooves and a rear surface on an edge forming a rear-end one of the locking grooves has a stepped part sloping continuously from an arcuately shaped bottom of the interlocking groove to a region above the surface.

When, e.g., the rear surface on the edge that forms the locking groove on the rear end has the step part, in cases in which the pushing of the operating button ceases before the linking member has finished being displaced to the furthest forward end, the locking pin that is in the process of sliding toward the locking groove on the rear end contacts the inclined step part. As a result, the locking pin is guided by the succeeding step part and thereby readily enters into and interlocks with the locking groove on the rear end. The locking pin can therefore be more readily and reliably interlocked with the locking groove on the rear end. The situation is the same when the front surface on the edge that forms the locking groove on the front end has the step part.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
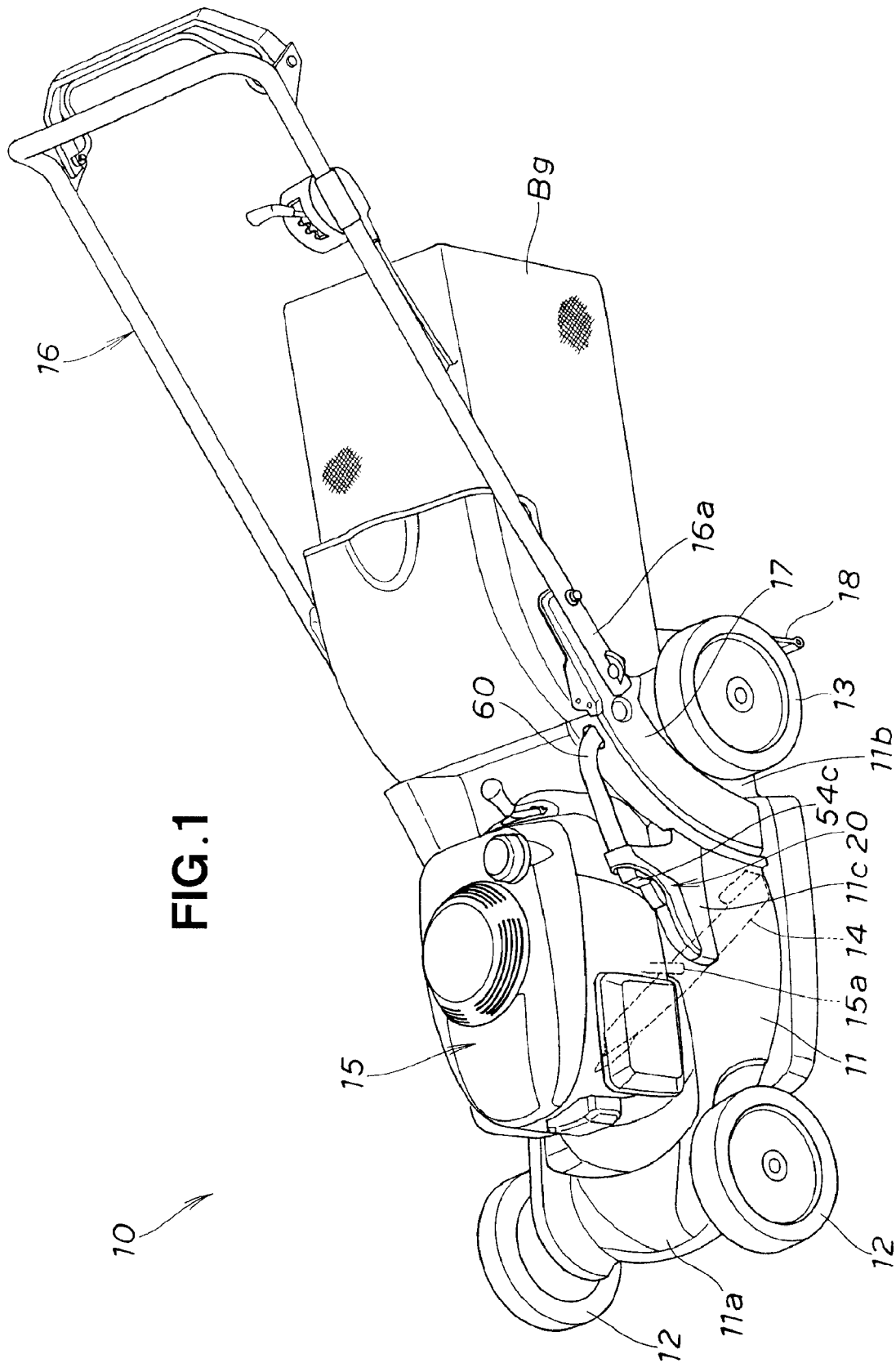
FIG. 1 is a perspective view illustrating a walk-behind lawnmower according to the present invention.

As shown in FIG. 1, a walk-behind lawnmower (referred to below simply as "lawnmower") 10 is a walk-behind self-propelled work machine for cutting grass, and is composed of a housing (work-machine body) 11 that is open at the bottom; left and right front wheels 12, 12 that are provided to the front part of the housing 11; left and right rear wheels 13, 13 that are provided to the rear part of the housing 11; a mowing blade 14 housed in the central interior part of the housing 11; an engine (power source) 15 provided to the upper part of the housing 11; and an operating handle 16 extending to the rear from the rear part of the housing 11.

The housing 11 is composed of, e.g., a resin-molded article and also serves as a chassis. The engine 15 is laid over and bolted to the upper surface of the housing and thereby integrally assembled therewith. The engine 15 is a vertical engine that has an output shaft 15a extending from a lower end of the engine into the housing 11 toward a lawn La (FIG. 4) below. The output shaft 15a is a driving shaft that is substantially perpendicular with respect to the lawn (ground) La.

The blade 14 is attached to the output shaft 15a within the housing 11. The blade 14 is driven by the engine 15, whereby the blade 14 rotates about the output shaft 15a within the housing 11.

In the lawnmower 10, the engine 15 causes the blade 14 to rotate, whereby grass is cut away, and airflow (swirl flow) is produced within the housing 11. The swirl flow causes the grass cut by the blade 14 to be carried into and stored in a cut-grass storage unit Bg.

Figure 2:
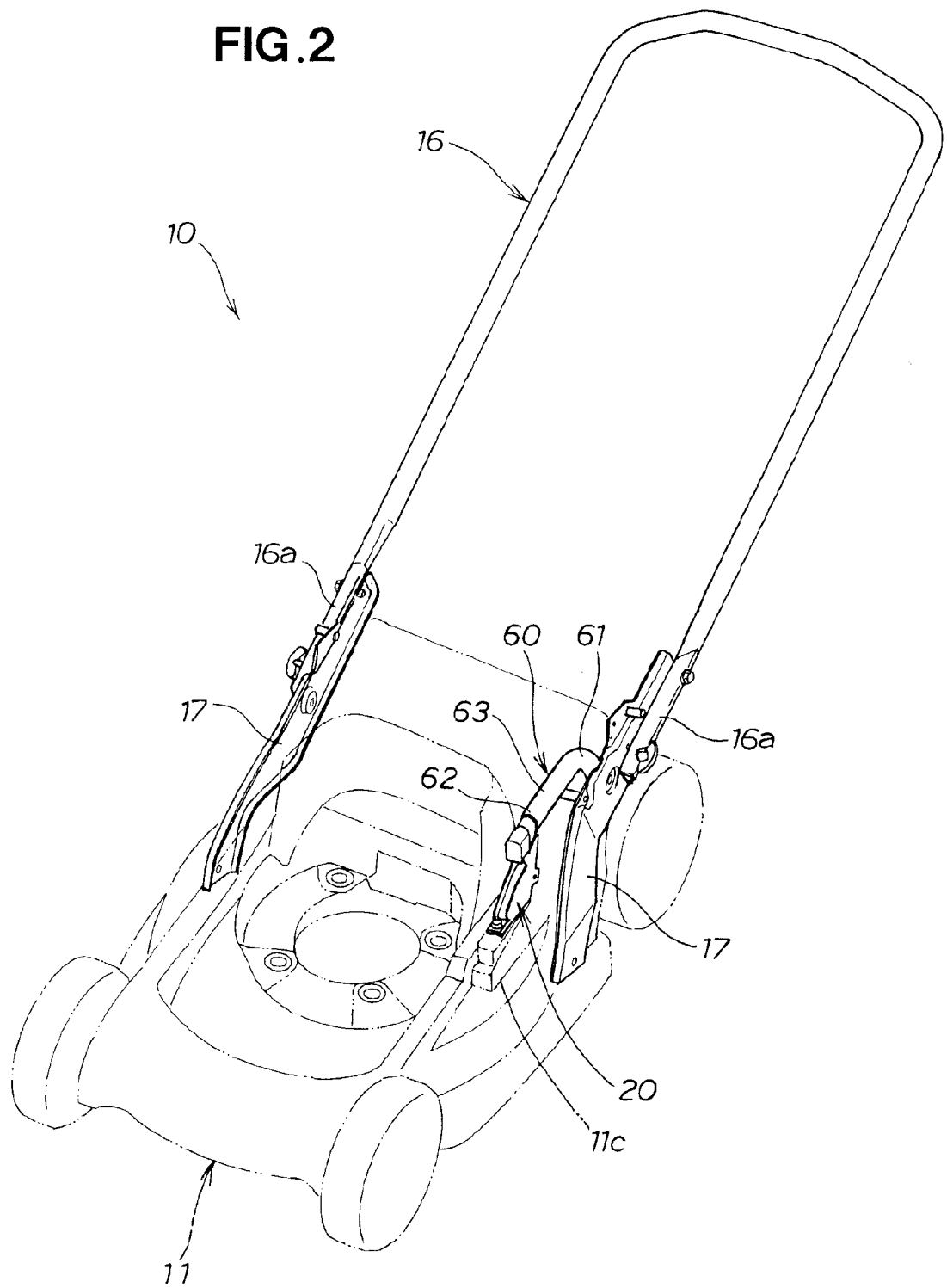
FIG. 2 is a perspective view showing a relationship of the operating handle, a height adjusting mechanism and a height adjusting grip with respect to the housing of FIG. 1.

The operating handle 16 is formed into a substantially inverted U-shape when the lawnmower 10 is viewed from the front, as shown in FIGS. 1 and 2. A pair of left and right proximal end parts 16a, 16a of the operating handle 16 is attached to the rear part of the housing 11 via respective stays 17, 17. The stays 17, 17 are bolted to the rear part of the housing 11.

The lawnmower 10 has a rear shield 18 that hangs down from the rear end part of the housing 11, as shown in FIG. 1. The rear shield 18 prevents debris from being projected toward the operator in the rear.

Figure 3:
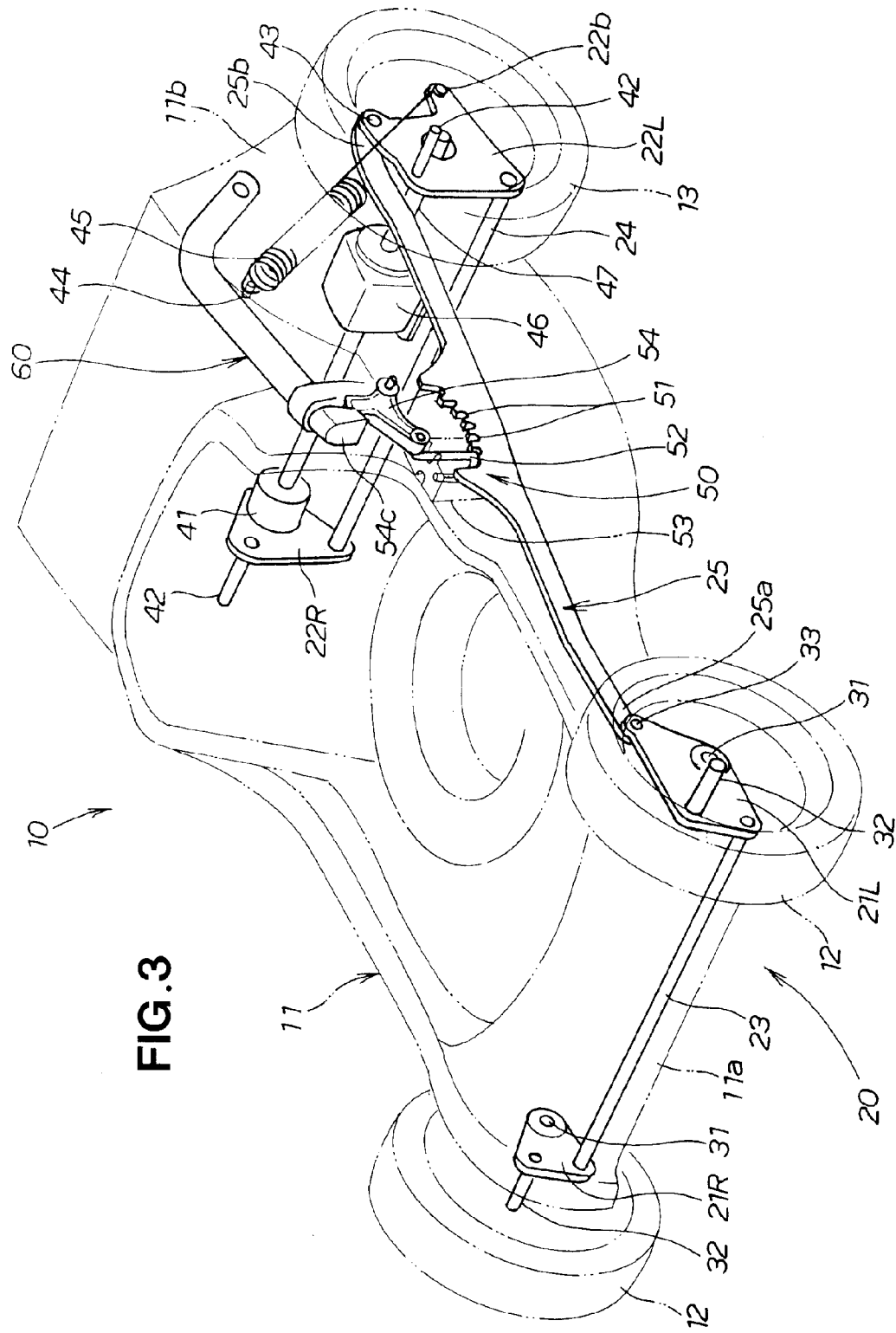
FIG. 3 is perspective view showing the height adjusting mechanism and the height adjusting grip of FIG. 1.

As shown in FIGS. 1 and 3, the lawnmower 10 has a height adjusting mechanism 20 and a height adjusting grip 60 on either the left or right side of the housing 11 (the left side in FIGS. 1 and 3). The height adjusting mechanism 20 adjusts the height of the housing 11 and the blade 14 (see FIG. 1) in relation to the ground, i.e., the height above the ground.

Figure 4:
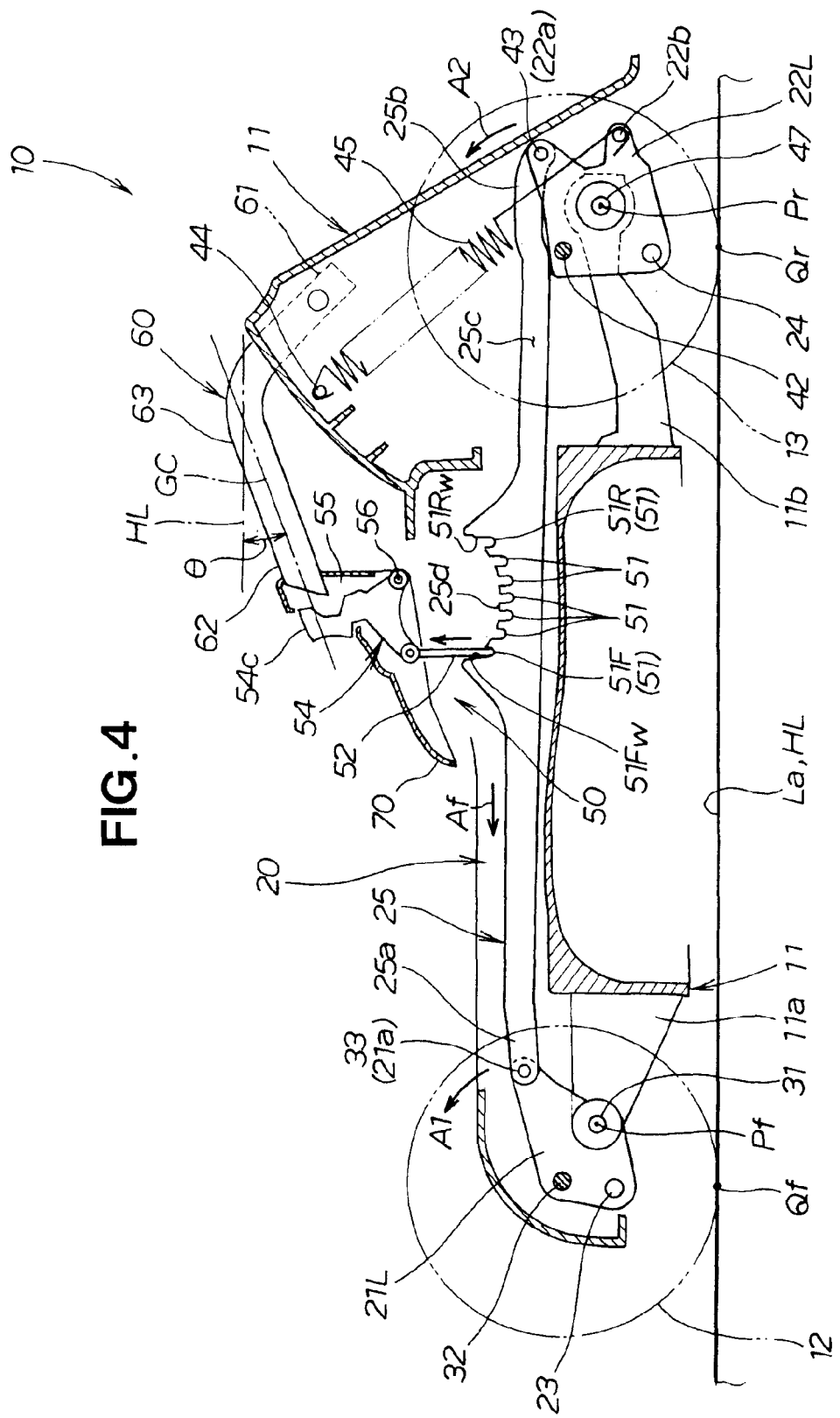
FIG. 4 is a lateral cross-sectional view of the height adjusting mechanism and the height adjusting grip of FIG. 3 when the height of the housing above the ground is at a minimum.
Figure 5:
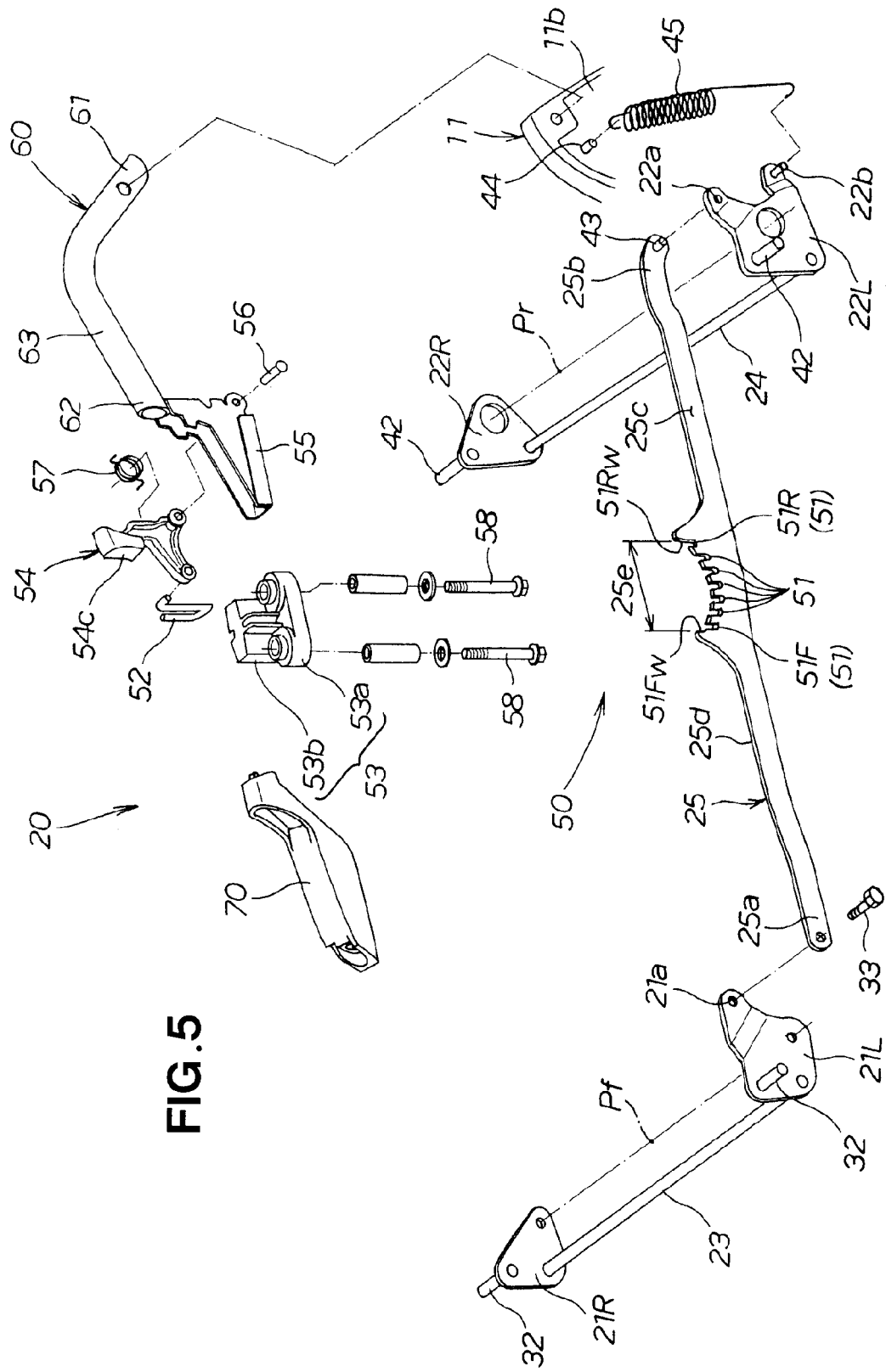
FIG. 5 is an exploded view of the height adjusting mechanism and the height adjusting grip of FIG. 4.

FIG. 4 shows a state in which the height of the housing 11 in relation to the lawn La, i.e., the height above the ground of the housing 11, is set to a minimum. The height adjusting mechanism 20 is composed of left and right front wheel-supporting members 21L, 21R, left and right rear wheel-supporting members 22L, 22R, a forward linking rod 23, a rear linking rod 24, a linking member 25, and a locking mechanism 50, as shown in FIGS. 3 through 5.

The left and right front wheel-supporting members 21L, 21R are composed of plates that are linked to a front part 11a of the housing 11 so as to be capable of swinging up and down, and are positioned so as to face each other. More specifically, the front part 11a supports the left and right front wheel-supporting members 21L, 21R via supporting shafts 31, 31 so as to allow swinging (rotating) up and down. The left and right front wheel-supporting members 21L, 21R are linked by the forward linking rod 23 at sites that are offset forward and below (in FIG. 4) from the supporting shafts 31, 31. The left and right front wheel-supporting members 21L, 21R therefore swing in unison.

The left and right front wheel-supporting members 21L, 21R also have axles 32, 32 at sites offset forward and below (in FIG. 4) from the supporting shafts 31, 31. The axles 32, 32 extend outward in the widthwise direction of the mower from the left and right front wheel-supporting members 21L, 21R, and are rotatably attached on the end parts to the front wheels 12, 12. The left and right front wheel-supporting members 21L, 21R therefore rotatably support the front wheels 12, 12. The left front wheel-supporting member 21L has a linking hole 21a at a site offset above and to the rear (in FIG. 4) from the axle 32. The linking hole 21a is positioned higher than the axle 32 of the front wheel 12 when the position of the housing 11 above the ground is at a minimum, as shown in FIG. 4.

The left and right rear wheel-supporting members 22L, 22R are composed of plates that are linked to a rear part 11b of the housing 11 so as to be capable of swinging up and down, and are positioned so as to face each other. More specifically, the housing 11 supports a center part Pr of the left and right rear wheel-supporting members 22L, 22R on left and right lateral parts of the rear part 11b via respective shaft bearings 41, 41 (shown only on the right in FIG. 3) so as to allow swinging (rotating) up and down. The center part Pr is the center of swinging Pr of the left and right rear wheel-supporting members 22L, 22R in relation to the housing 11.

The sites on the left and right rear wheel-supporting members 22L, 22R that are offset forward and below (in FIG. 4) from the center of swinging Pr are linked by the rear linking rod 24. The left and right rear wheel-supporting members 22L, 22R therefore swing in unison.

The left and right rear wheel-supporting members 22L, 22R also have axles 42, 42 at sites offset forward and below (in FIG. 4) from the center of swinging Pr. The axles 42, 42 extend outward in the widthwise direction of the mower from the left and right rear wheel-supporting members 22L, 22R and are rotatably attached on the end parts to the rear wheels 13, 13. The left and right rear wheel-supporting members 22L, 22R therefore rotatably support the front wheels 13, 13.

The left rear wheel-supporting member 22L has a linking hole 22a at a site offset above and to the rear (in FIG. 4) from the center of swinging Pr, and a spring-peg pin 22b at a site offset below and to the rear (in FIG. 4) from the center of swinging Pr. The linking hole 22a is positioned higher than the axle 42 of the rear wheel 13 when the position of the housing 11 above the ground is at a minimum, as shown in FIG. 4.

The linking member 25 is a long, thin plate-shaped bar that extends in the forward-and-backward direction along the housing 11 and links together the left front wheel-supporting member 21L and the left rear wheel-supporting member 22L so as to allow concerted motion. More specifically, the linking member 25 is formed in a vertical-plate shape overlapping the plate surfaces of the left front wheel-supporting member 21L and the left rear wheel-supporting member 22L.

A front end part 25a of the linking member 25 is linked to the linking hole 21a of the left front wheel-supporting member 21L by a linking pin 33 so as to be capable of relative rotation in the forward-and-backward direction. A rear end part 25b of the linking member 25 is linked to the linking hole 22a of the left rear wheel-supporting member 22L by a linking pin 43 so as to be capable of relative rotation in the forward-and-backward direction. The linking member 25 is therefore displaced in the forward-and-backward direction and in the up and down direction according to the swinging motion of the front and rear wheel-supporting members 21L, 22L.

The adjustment system for adjusting the heights of the front wheels 12 and the rear wheels 13 relative to the housing 11 adjusts the front and rear wheels 12, 13 in a linked fashion. The force required for the operator to lift up the housing 11 is therefore larger than in adjustment systems for adjusting the front and rear wheels 12, 13 separately. In response to this issue, a spring (urging member) 45 is hung between the spring-peg pin 22b and an upper spring-peg pin 44 on the upper rear part of the housing 11, as shown in FIGS. 3 through 5. The spring 45 urges the left rear wheel-supporting member 22L in a direction so that the height of the housing 11 above the ground increases; i.e., urges the left rear wheel-supporting member 22L in a direction so as to rotate counter-clockwise when viewing the lawnmower 10 from the left as shown in FIG. 4. The spring comprises, e.g., an extension coil spring. The operator can therefore easily lift up the housing 11.

The spring 45 is not limited to an extension coil spring; e.g., a compression coil spring may also be employed. In such a case, the compression coil spring is configured to be in a maximally compressed state when the height of the housing 11 above the ground is at a minimum. The compression coil spring is set in a compressed state in advance, whereby the urging force can be set to be higher when the height of the housing 11 above the ground is lower. Such settings allow the operator to easily lift up the housing 11 even when using a small compression coil spring that has a small spring constant.

A gas damper may also be employed instead of the spring 45.

Figure 6:
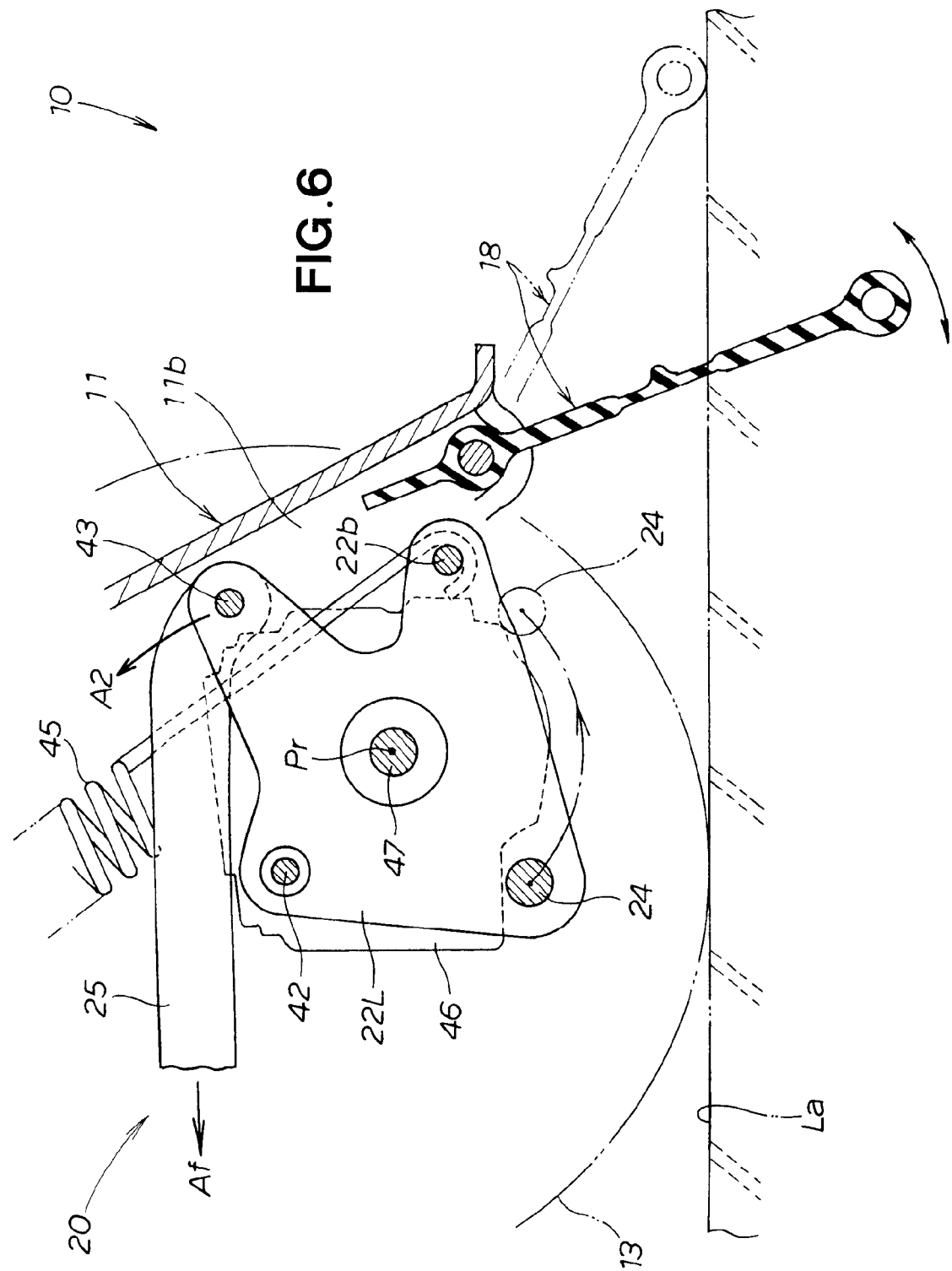
FIG. 6 is a cross-sectional view of a rear part of the height adjusting mechanism of FIG. 4.
Figure 7:
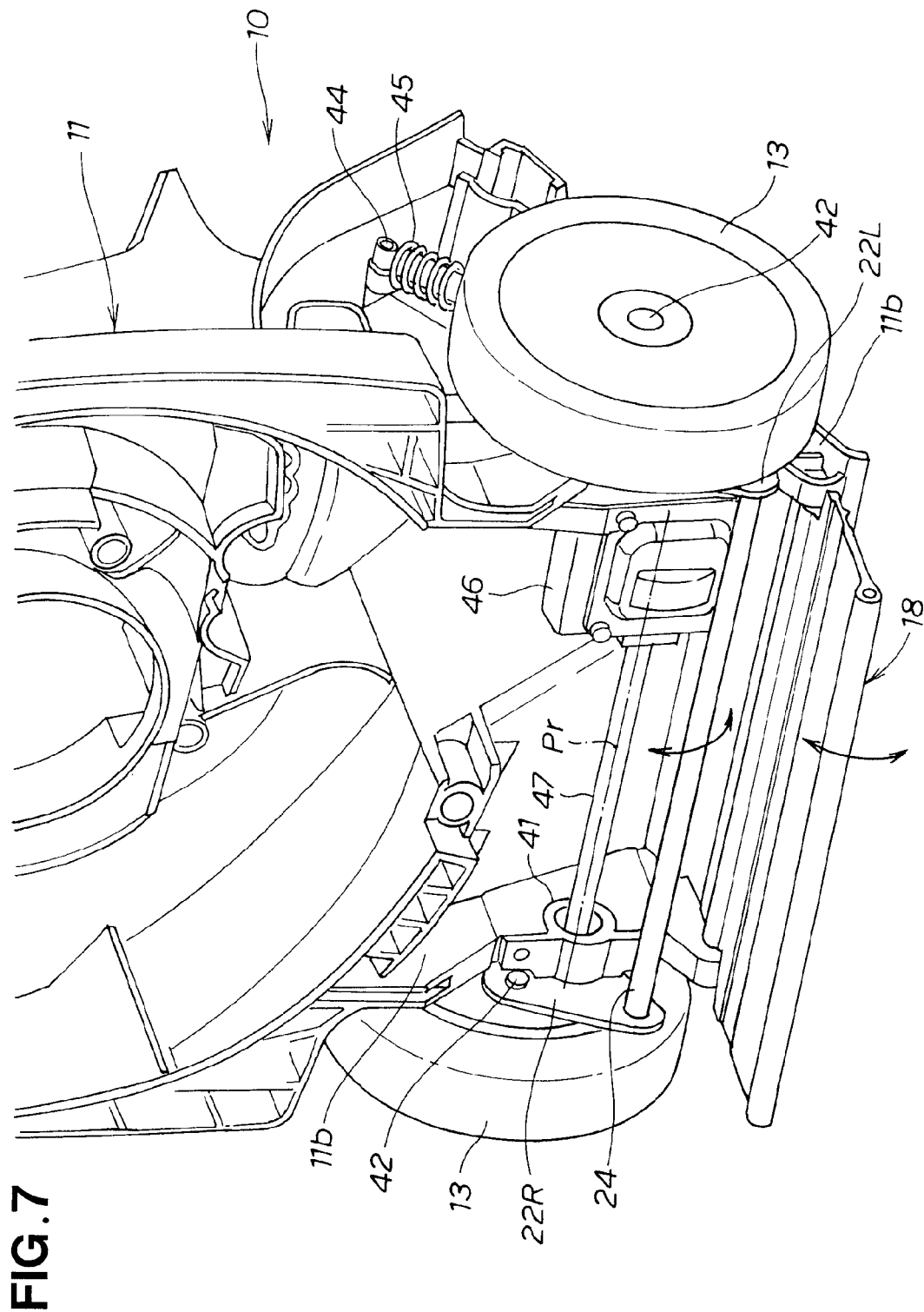
FIG. 7 is a perspective view showing a rear part of the walk-behind lawnmower of FIG. 1, as seen from below.

The housing 11 is further provided with a variable speed drive 46 and a transmission shaft 47 on the rear part 11b, as shown in FIGS. 3, 6, and 7. The transmission shaft 47 is linked to the variable speed drive 46 and extends horizontally in the widthwise direction of the mower at the center of swinging Pr. Both ends of the transmission shaft 47 are linked to the left and right rear wheels 13, 13 at interior parts of the rear wheels 13, 13 via a gear transmission mechanism (not shown). The engine 15 (FIG. 1) is used to drive the rear wheels 13, 13 in forward rotation via the variable speed drive 46, the transmission shaft 47, and the gear transmission mechanism, whereby the lawnmower 10 is propelled forward automatically, and lawn-mowing operations are continued.

Figure 8:
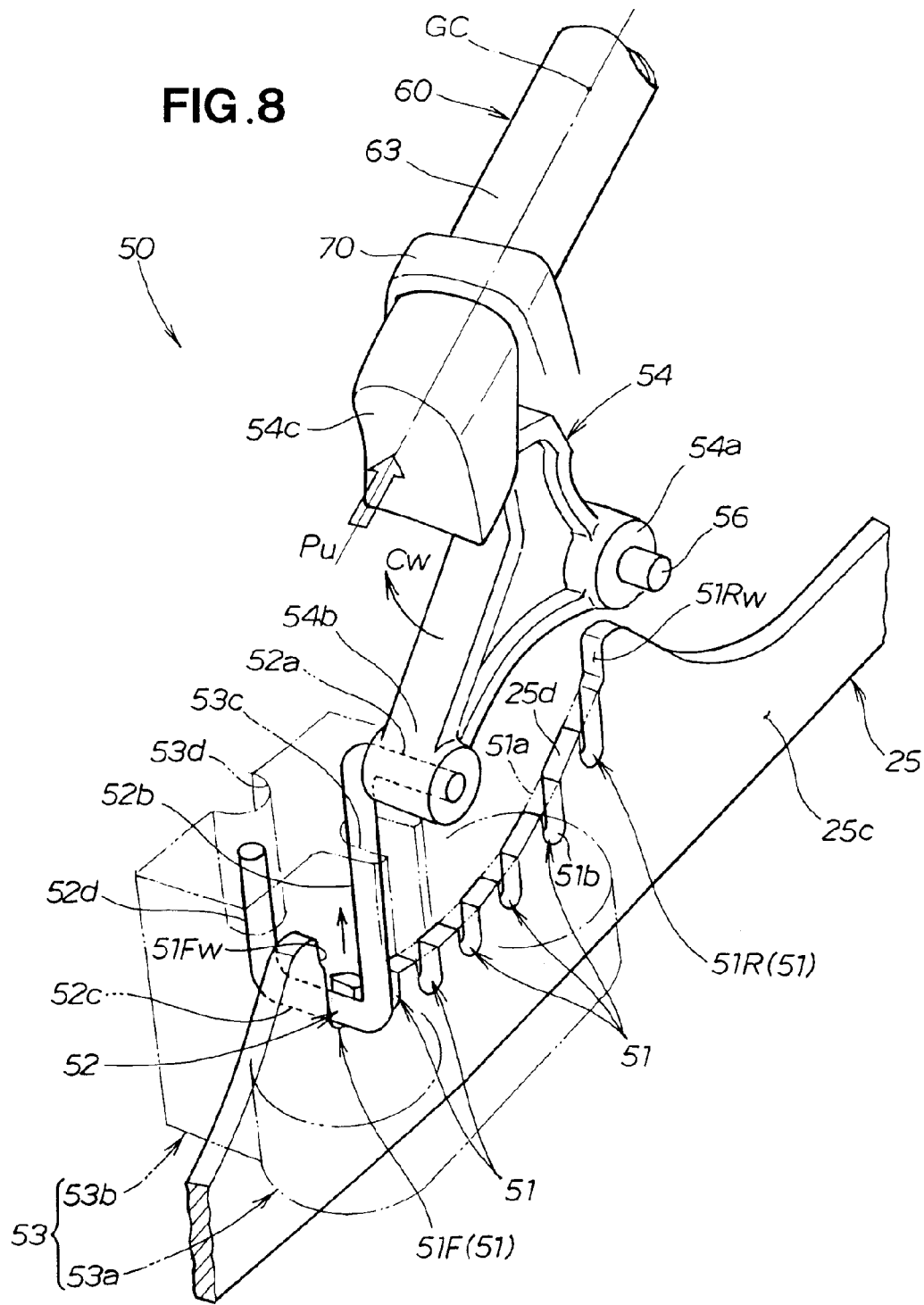
FIG. 8 is a perspective view illustrating a major part of a locking mechanism of FIG. 3.
Figure 9:
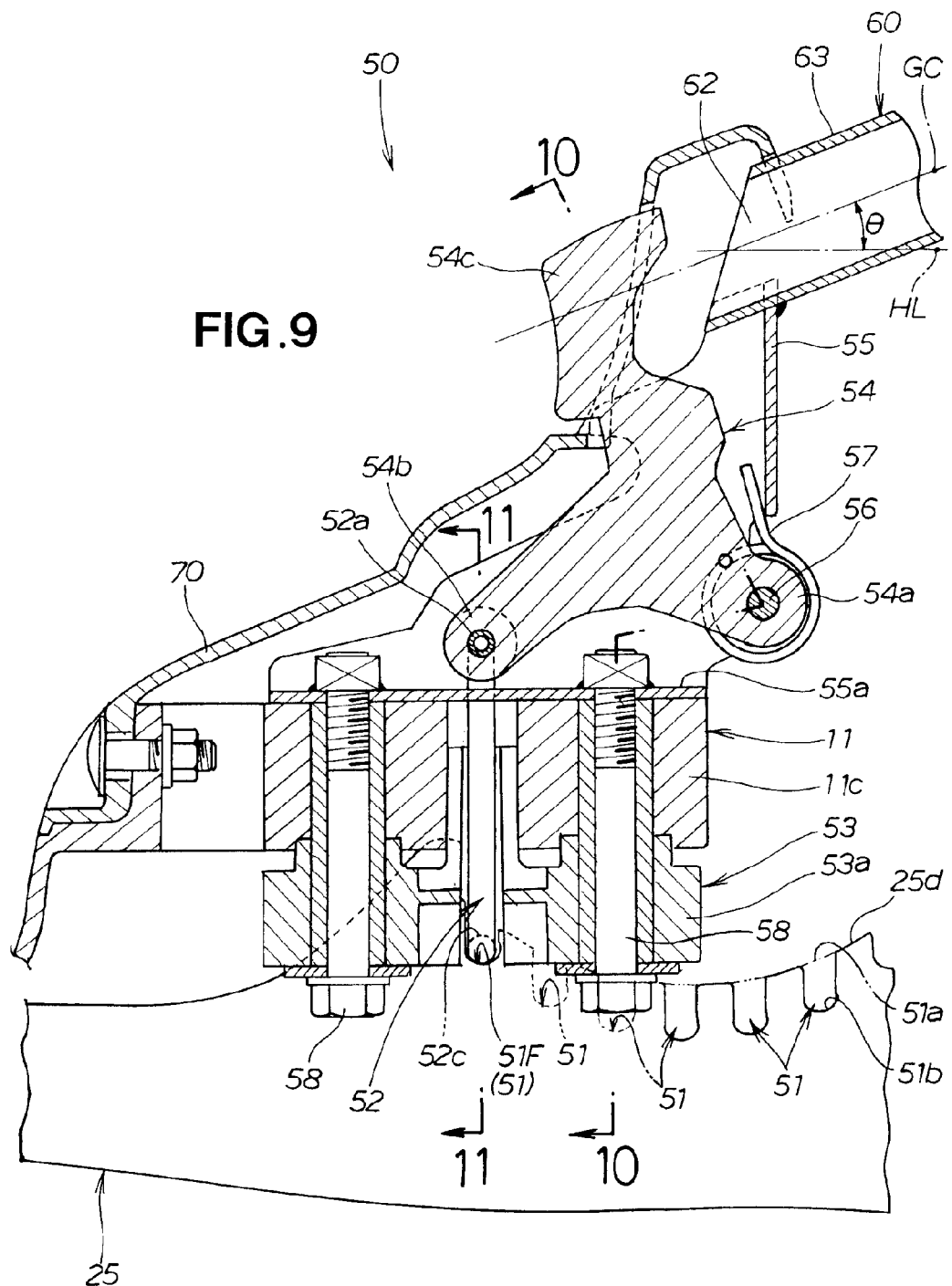
FIG. 9 is a lateral cross-sectional view illustrating an area around the locking mechanism of FIG. 8.

The locking mechanism 50 serves to restrict and release displacement of the linking member 25 in the forward-and-backward direction and is composed of a plurality of locking grooves 51, a locking pin 52, a pin-guiding part 53, an operating member 54, and a bracket 55, as shown in FIGS. 4, 8, and 9.

The plurality (e.g., seven) of the locking grooves 51 is aligned and formed in a row from front to rear along a plate surface 25c of the linking member 25 in the center part of the linking member 25 in the longitudinal direction, as shown in FIGS. 4 and 8. More specifically, each locking grooves 51 is U-shaped when viewed from the direction of the plate surface 25c of the linking member 25 and extend through in the thickness direction of the plate. In other words, in the locking grooves 51, an upper end 51a opens receding downward from an upper end surface 25d of the linking member 25, and a bottom 51b is formed in an arcuate shape, as shown in FIGS. 8 and 9.

Figure 11:
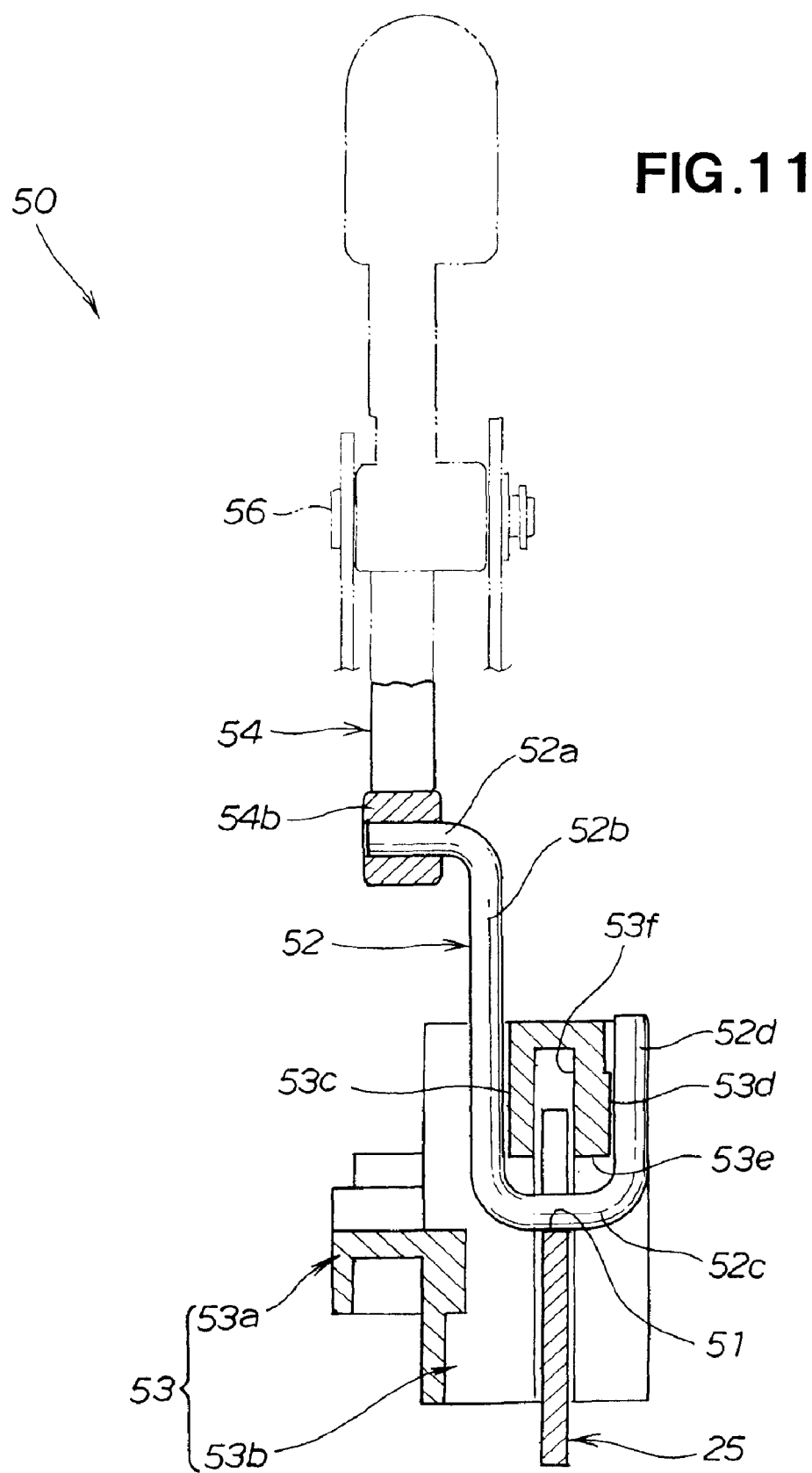
FIG. 11 is a cross-sectional view taken along line 11-11 of FIG. 9.

The locking pin 52 is capable of selectively interlocking with one of the locking grooves 51 and is, e.g., a bent molded article such as a round bar or a round pipe. As shown in FIGS. 8 and 11, the locking pin 52 is substantially J-shaped and is composed of a horizontal link-receiving part 52a on the top part, a first perpendicular part 52b that extends downward from one end of the link-receiving part 52a, a horizontal interlocking part 52c that extends laterally from the lower end of the first perpendicular part 52b, and a second perpendicular part 52d that extends upward from the other end of the interlocking part 52c.

The link-receiving part 52a, the first perpendicular part 52b, the interlocking part 52c, and the second perpendicular part 52d are all aligned in the same plane. The interlocking part 52c is parallel to the link-receiving part 52a and extends in the opposite direction from the link-receiving part 52a. The interlocking part 52c is the portion that interlocks with one of the locking grooves 51 and extends in the direction for passing through the locking groove 51. The second perpendicular part 52d is parallel to the first perpendicular part 52b and is shorter than the first perpendicular part 52b.

The pin-guiding part 53 is provided to the housing 11 so as to slidably guide the locking pin 52 in the direction for entering into and retracting from one of the locking grooves 51, as shown in FIGS. 8 through 11. In other words, the pin-guiding part 53 is attached from below to a grip-attachment part 11c of the housing 11. The grip-attachment part 11c bulges upward from the upper surface of the housing 11, as shown in FIG. 1.

The pin-guiding part 53 is composed of a base portion 53a that is bolted to the lower end surface of the grip-attachment part 11c and covers that surface from below; and a guiding portion 53b that is formed integrally on a lateral part of the base portion 53a. The guiding portion 53b has a first groove 53c that passes through up and down so as to slidably guide the first perpendicular part 52b of the locking pin 52 up and down; a second groove 53d that passes through up and down so as to slidably guide the second perpendicular part 52d up and down; a third groove 53e that passes between the first groove 53c and the second groove 53d so as to allow passage of the interlocking part 52c; and a fourth groove 53f that passes through forward and backward so as to slidably guide the linking member 25 forward and backward.

The first groove 53c is open toward the outside in the widthwise direction of the housing 11. The second groove 53d is open toward the inside in the widthwise direction of the housing 11. The third groove 53e and the fourth groove 53f are open toward the area below the housing 11.

The locking pin 52 can slide up and down guided by the first groove 53c and the second groove 53d. The portion of the linking member 25 positioned at the locking grooves 51 can slide forward and backward guided by the fourth groove 53f. The interlocking part 52c of the locking pin 52 can slide in the direction for entering into or retracting from one of the locking grooves 51 through the fourth groove 53f. The depth of the third groove 53e is set so that the locking pin 52 does not make contact when sliding up and down by predetermined amounts.

The operating member 54 is provided to the housing 11 so as to slide and operate the locking pin 52, as shown in FIGS. 8 through 11. In other words, the operating member 54 is supported so as to be able slide forward and backward by the bracket 55 that is attached to the housing 11. More specifically, the operating member 54 is has a substantially inverted Y-shape when the lawnmower 10 is viewed from the side and is an integrally molded article that is composed of a supported part 54a positioned on the lower rear part, a linking part 54b positioned on the lower front part, and an operating button 54c positioned on the upper part.

The supported part 54a is slidably supported by the bracket 55 via a supporting pin 56. The linking part 54b links to the link-receiving part 52a of the locking pin 52 so as to allow relative rotation. The operating button 54c can be operated by being pushed from the front toward the rear of the lawnmower 10. The locking pin 52 swings up and down due to the swinging of the operating member 54. The operating member 54 is urged by an urging member 57 (return spring 57) in a direction for causing the locking pin 52 to interlock with one of the locking grooves 51, i.e., in a direction for returning to a neutral position. The urging member 57 is composed of, e.g., a torsion coil spring.

The operating button 54c of the operating member 54 is pushed and operated, whereby the adjustment operations of the height adjusting mechanism 20 (see FIG. 4) can be switched from a restricted state to a permissive state. The restricted state is a state in which the locking pin 52 is interlocked with one of the locking grooves 51. The permissive state is a state in which the locking pin 52 is separated from all of the locking grooves 51.

Figure 10:
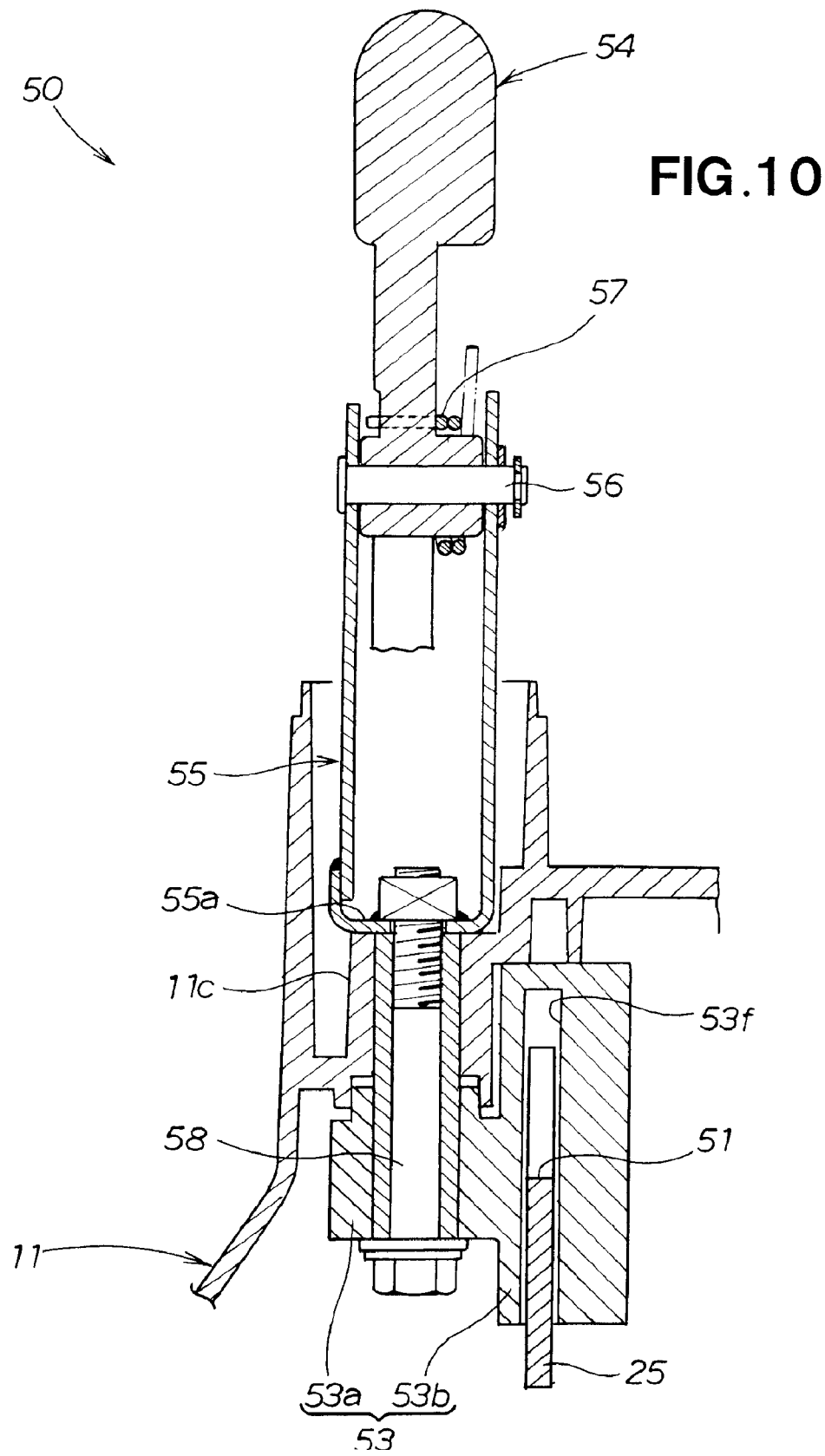
FIG. 10 a cross-sectional view taken along line 10-10 of FIG. 9.

The bracket 55 is attached to the grip-attachment part 11c from above, as shown in FIGS. 9 and 10. Specifically, the grip-attachment part 11c is sandwiched by a bottom plate 55a of the bracket 55 and the pin-guiding part 53 and is held together therewith by bolts 58, 58, and thereby affixed to the housing 11.

As shown in FIGS. 4 and 5, the height adjusting grip 60 is a long and thin member that can be grasped by a hand so as to raise or lower (lift up or push down) the housing 11 when the operating button 54c is operated, whereby the adjustment operation of the height adjusting mechanism 20 is permitted. The height adjusting grip is composed of, e.g., a pipe. The height adjusting grip 60 is provided to the vicinity of either the left or right side (the left side in FIGS. 1 and 3) of the housing 11, as described above. More specifically, an end part 61 of the height adjusting grip 60 is bolted to the rear part of the housing 11 along with the left stay 17 (see FIG. 2). Another end part 62 of the height adjusting grip 60 is affixed to the bracket 55. As a result, the height adjusting grip 60 is attached to the housing 11.

The operating member 54 (excluding the operating button 54c), the bracket 55, and the other end part 62 (forward end part 62) of the height adjusting grip 60 are covered by a cover 70.

Figure 12A:
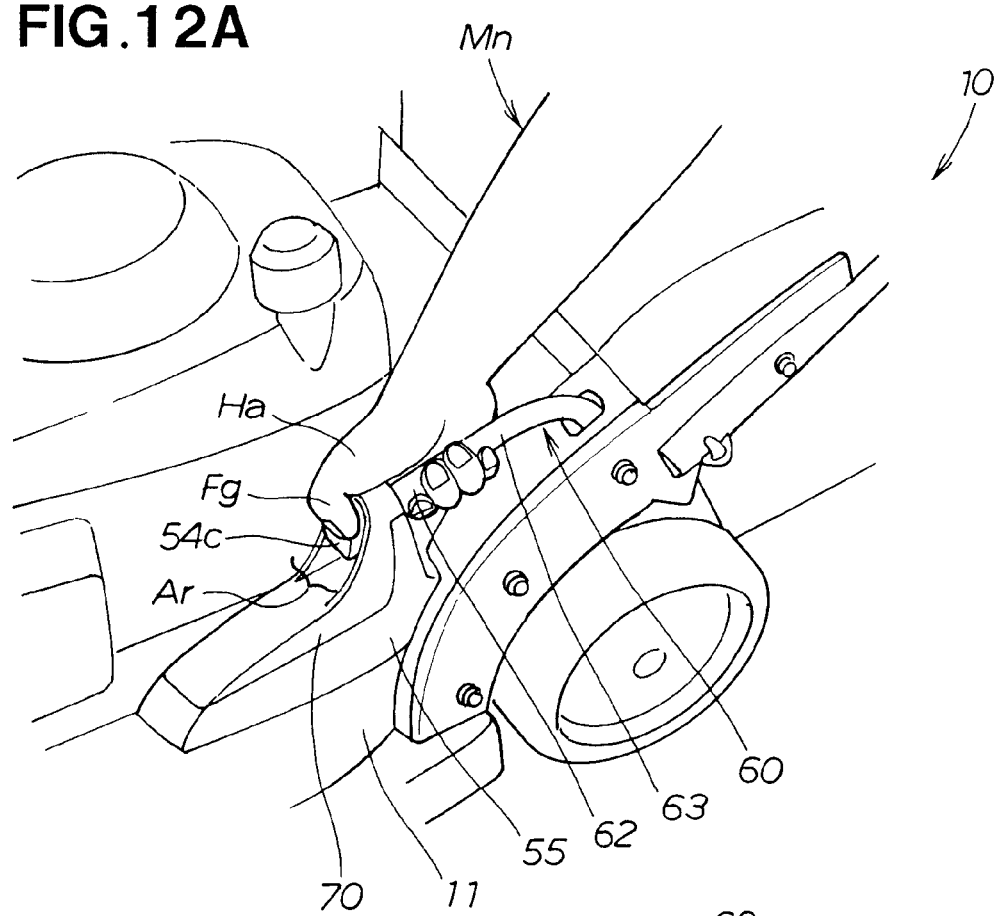
FIGS. 12A and 12B illustrate an arrangement and an operation of the height adjusting grip of FIG. 1.
Figure 12B:
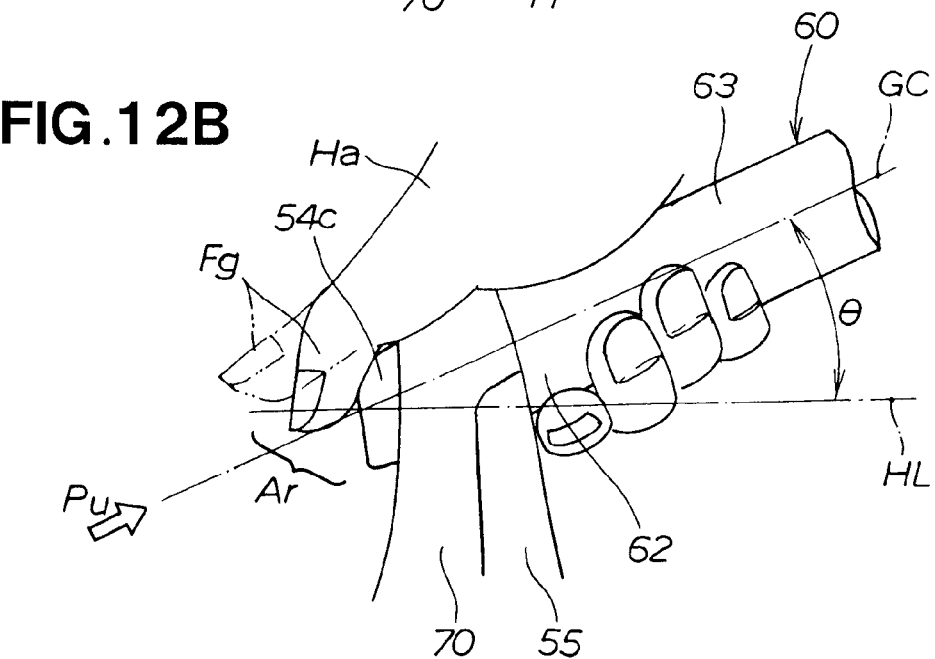

The relationship of the operating button 54c and the height adjusting grip 60 to the housing 11 will now be described. FIG. 12A shows the relationship of the operating button 54c and the height adjusting grip 60 to the housing 11. FIG. 12B displays an enlargement of the relationship of the operating button 54c and the height adjusting grip 60 shown in FIG. 12A.

As shown in FIGS. 12A and 12B, the height adjusting grip 60 is inclined with respect to the housing 11 so as to lengthen and descend forward in the forward-and-backward direction. The height adjusting grip has a grip part 63 that can be grasped at the site that is inclined forward and down. In other words, the height adjusting grip 60 has a substantially mountain-top shape when the lawnmower 10 is viewed from the side, and the forward half portion of the height adjusting grip is the grip part 63.

A forward descending inclination angle $\theta$ of the height adjusting grip 60, i.e., the inclination angle $\theta$ of the grip part 63, is set in a range from 20° to 30° ($20° \leq \theta \leq 30°$, as shown in FIG. 4. The forward descending inclination angle $\theta$ is defined as follows. When the front wheels 12 and the rear wheels 13 are in contact with the lawn La, a straight line HL that passes through a ground-contact point Qf of the front wheels 12 and a ground-contact point Qr of the rear wheels 13 is the reference horizontal line HL. The reference horizontal line HL is parallel to the ground La. The forward descending inclination angle θ is the slanting angle of a center line GC of the grip part 63 of the height adjusting grip 60 relative to the reference horizontal line HL.

The operating button 54c is positioned in an area Ar that allows operation by a finger Fg (thumb Fg) of a hand Ha that grasps the height adjusting grip 60, as shown in FIGS. 12A and 12B. More specifically, the operable area Ar is the position and vicinity thereof in line with the center line GC of the grip part 63 and directly in front of the forward end portion (other end part 62) of the grip part 63. In the example shown in FIG. 12B, when the thumb Fg of the hand Ha grasping the forward end portion of the grip part 63 is extended forward as shown by the imaginary lines, the operable area Ar is the area in which the thumb Fg can be bent inward as shown by the solid lines, whereby the operating button 54c can be pushed toward the grip part 63.

The height adjusting grip 60 is provided to the vicinity of either the left or right side of the housing 11. The height adjusting grip 60 can therefore be readily and firmly (tightly) grasped when raising or lowering the housing 11. The operating button 54c is positioned in an area that allows operation by the finger Fg of the hand Ha that grasps the grip part 63 of the height adjusting grip 60. The finger Fg of the hand Ha that firmly grasps the height adjusting grip 60 can therefore readily be used to operate (push or move back) the operating button 54c. The hand Ha grasping the height adjusting grip 60 need not repeatedly release and regrip when operating the operating button 54c. The operability of the height adjusting mechanism 20 is thus further increased. An operator Mn can use just one hand to adjust the height of the housing 11 and the blade 14 (see FIG. 1) in relation to the ground. As a result, the height of mowing can be simply and easily adjusted.

The operating button 54c is positioned so that a pushing direction Pu is substantially parallel to the center line GC of the grip part 63 of the height adjusting grip 60 (e.g., is positioned on the center line GC). The thumb Fg of the hand Ha therefore pushes the operating button 54c from the direction Pu that is substantially perpendicular to the direction in which the hand Ha is used to firmly grasp the height adjusting grip 60. The pushing direction Pu is the direction in which the thumb Fg of the hand Ha that grasps the height adjusting grip 60 most readily applies force. The operating button 54c can therefore be readily and reliably operated.

The lawnmower 10 is small in scale, and the operator Mn therefore leans over during the operation for adjusting the height adjusting mechanism 20. The operator Mn also stands to the side of the lawnmower 10. When, e.g., the height adjusting grip 60 is provided to the vicinity of the left side of the housing 11, the operator Mn stands leaning over the left side of the lawnmower 10 and uses the right hand Ha to grasp the height adjusting grip 60. The height adjusting grip 60 is tilted so as to lengthen and descend forward in the forward-and-backward direction in relation to the housing 11 so that the height adjusting grip 60 can be easily grasped and raised or lowered by the hand Ha that naturally drops down when assuming such a leaning posture. The forward descending inclination angle θ is set in a range from 20° to 30°, whereby the height adjusting grip 60 can be grasped even more readily. The height adjusting grip 60 is readily grasped by the hand Ha, and therefore force can be readily imparted to the thumb Fg of the hand Ha grasping the height adjusting grip 60. The operability of the height adjusting mechanism 20 therefore increases.

Figure 13:
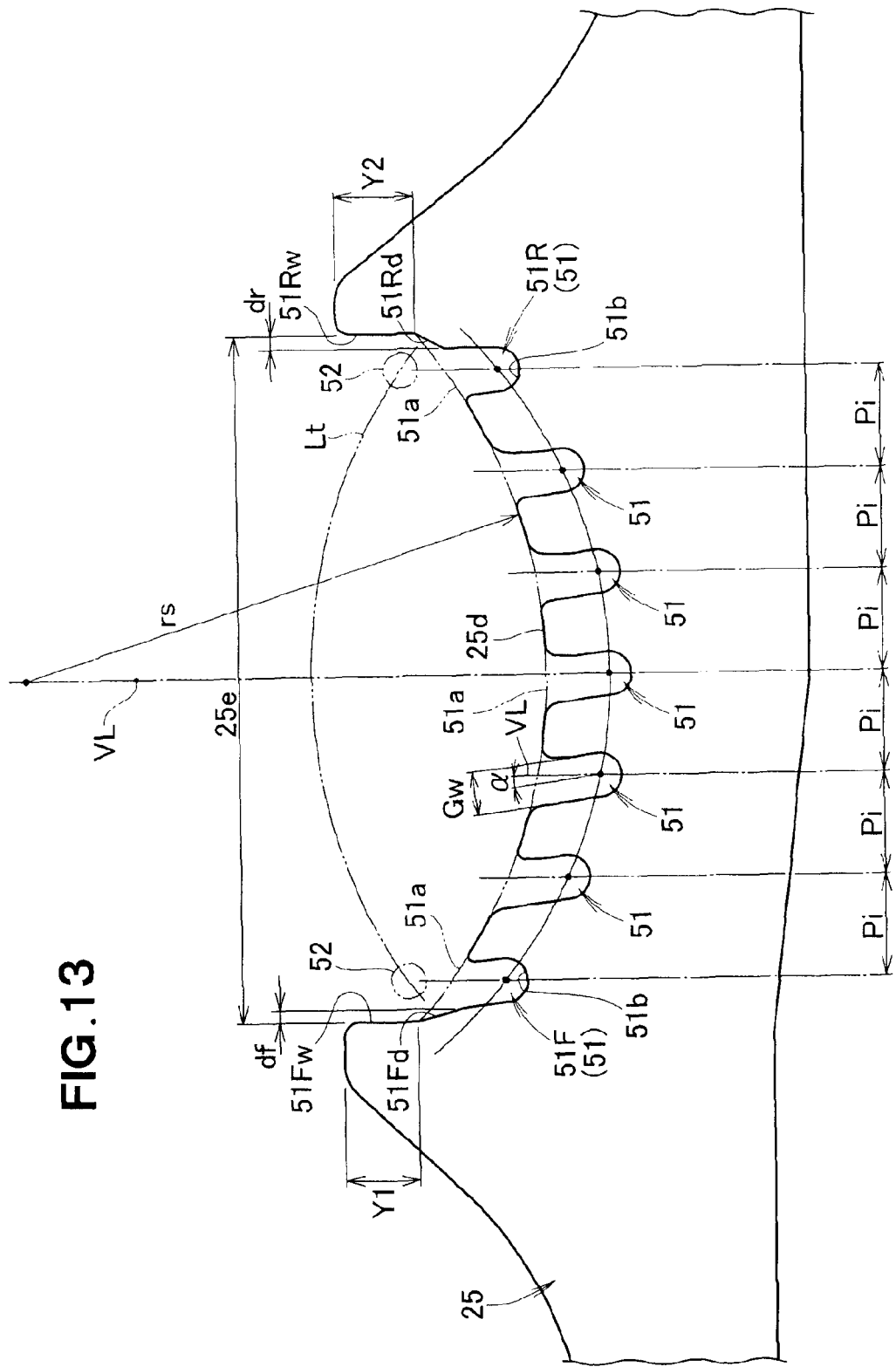
FIG. 13 is an enlarged view showing a linking member and locking grooves of FIG. 4.
Figure 14:
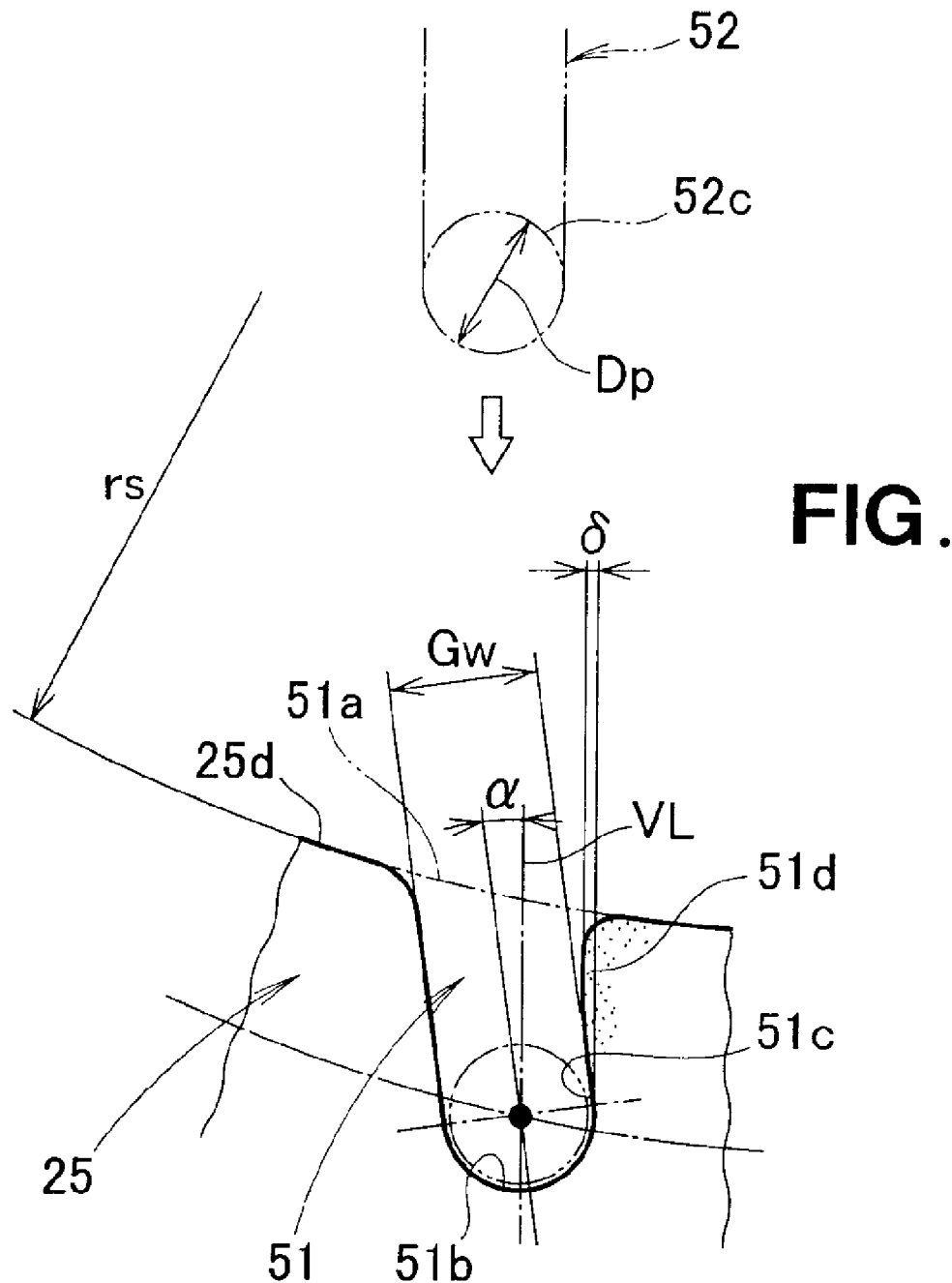
FIG. 14 is an enlarged view showing one of the locking grooves of FIG. 13.

The locking grooves 51 will next be described in detail. The locking grooves 51 are mutually parallel, as shown in FIGS. 13 and 14. The locking grooves 51 are arrayed at a fixed Pi (interval Pi). The locking pin 52 is therefore locked in at the constant array pitch Pi when the linking member 25 is moved forward and backward.

The locking grooves 51 comprises U-shaped grooves in which the upper end 51a opens receding downward from the upper end surface 25d of the linking member 25, as described above. The groove width of the locking grooves 51 is Gw and is set to be slightly larger than a diameter Dp of the interlocking part 52c of the locking pin 52. As an example, the cut grass attached to the lawnmower 10 shown in FIG. 1 (the grass cut by the blade 14) may be knocked loose. The locking pin 52 that is interlocked with the locking groove 51 is not readily separated therefrom even by the vibration produced in such instances.

The locking grooves 51 is mutually parallel and slanted toward the front (toward the front end part 25a of the linking member 25 shown in FIG. 4). An inclination angle α of the locking grooves 51 in relation to a vertical line VL is set in a range from 3° to 7° (3°≦α≦7°). The vertical line VL is the straight line that is perpendicular in the up and down direction to the reference horizontal line HL shown in FIG. 4.

In other words, the upper end of the locking groove 51 is positioned further toward the front than the bottom 51b of the locking groove 51. A part 51d of a groove wall 51c on the opposite side from the slant protrudes into the locking groove 51 by the amount that the locking groove 51 is slanted, as shown in FIG. 14. In other words, the part 51d of the groove wall 51c protrudes into the locking groove 51 and comprises a protruding part 51d for preventing detachment. The extent of protrusion of the protruding part 51d is 6. The locking pin 52 that is interlocked with the locking groove 51 contacts the protruding part 51d when sliding upward along the vertical line VL. The locking pin 52 that is interlocked with the locking groove 51 therefore does not slip away from the locking groove 51 due to vibration or other influences.

The linking member 25 links together and allows associated motion of the front and rear wheel-supporting members 21L, 22L, which are linked to the housing 11 so as to be capable of swinging up and down, as in FIG. 4 and as described above. The linking member 25, therefore, is also displaced in the forward-and-backward direction and in the up and down direction according to the swinging up and down of the front and rear wheel-supporting members 21L, 22L.

In the present embodiment, the linking member 25 is linked to the left front wheel-supporting member 21L and the left rear wheel-supporting member 22L at a position above the axle 32 for the front wheel 12 and the axle 42 for the rear wheel 13. A displacement trajectory Lt (see FIG. 13) of the linking member 25 accompanying the swinging up and down of the front and rear wheel-supporting members 21L, 22L is therefore arcuately shaped and convex at the top. The displacement trajectory Lt of the locking grooves 51 aligned in a row from front to rear on the linking member 25 is therefore arcuately shaped and convex at the top. The locking grooves 51 aligned in a row from front to rear on the linking member 25 is therefore displaced in the up and down direction along with the linking member 25.

The amount of sliding of the locking pin 52 that is operated by the operating member 54 has no relationship to the amount of displacement in the up and down direction of the locking grooves 51. The position at which the locking pin 52 interlocks with any of the locking grooves 51 can therefore be made less deep according to the amount of displacement in the up and down direction of the locking grooves 51.

In contrast, in the present embodiment, the upper end surface 25d of the linking member 25 has an arcuate shape over the entirety of a portion 25e, at which the upper ends 51a (open end 51a, aperture 51a) of the locking grooves 51 are positioned, the arcuate shape corresponding to the displacement trajectory Lt in the forward-and-backward direction and in the up and down direction of the linking member 25. The displacement trajectory Lt is arcuately shaped and convex at the top in this embodiment, and the upper end surface 25d of the linking member 25 therefore crosses the entirety of the portion 25e, at which the upper ends 51a of the locking grooves 51 are positioned, and is an arcuately shaped surface formed having an arcuate shape that is concave at the bottom. The radius of the upper end surface 25d that comprises the arcuately shaped surface is rs.

The locking pin 52 can therefore be fully interlocked with all of the locking grooves 51 even when the upper ends 51a of the locking grooves 51 are displaced in the forward-and-backward direction and in the up and down direction. The locking pin 52 that is interlocked with the locking groove 51 therefore does not readily separate therefrom, and the operational reliability of the height adjusting mechanism 20 can therefore be further increased.

Among the locking grooves 51, a front surface 51Fw, which is on the edge that forms a locking groove 51F on the front end, and a rear surface 51Rw, which is on the edge that forms a locking groove 51R on the rear end, continue to extend farther upward than the upper end 51a of the locking groove 51F on the front end and the upper end 51a of the locking groove 51R on the rear end, as shown in FIGS. 4, 8, and 13.

Ranges Y1, Y2 to which the front surface 51Fw and the rear surface 51Rw extend upward are set so that the front surface 51Fw or the rear surface 51Rw faces the locking pin 52 when separated from the front and rear locking grooves 51F, 51R.

When the linking member 25 has been displaced in the forward-and-backward direction to the maximum limit, the upper end 51a of the locking groove 51F on the front end or the upper end 51a of the locking groove 51R on the rear end faces the locking pin 52. The locking pin 52 is guided by the front surface 51Fw or the rear surface 51Rw when the locking pin 52 is inserted into or retracted from the locking grooves 51F, 51R. The locking pin 52 can therefore be reliably inserted into or retracted from the locking grooves 51F, 51R. The operational reliability of the height adjusting mechanism 20 can therefore be further increased. The locking pin 52 runs into the front surface 51Fw or the rear surface 51Rw even when the linking member 25 is significantly displaced in the forward-and-backward direction, and further displacements therefore do not occur.

The front surface 51Fw has an inclined step part 51Fd that slopes continuously upward and forward from the arcuately shaped bottom 51b of the locking groove 51F on the front end, as shown in FIG. 13. The rear surface 51Rw has an inclined step part 51Rd that slopes continuously upward and toward the rear from the arcuately shaped bottom 51b of the locking groove 51R on the rear end. The front surface 51Fw and the rear surface 51Rw are thus formed as stepped surfaces.

More specifically, the front and rear step parts 51Fd, 51Rd are positioned in the vicinity of the upper ends 51a, 51a of the locking grooves 51F, 51R. The front and rear step parts 51Fd, 51Rd are composed of inclined surfaces that incline gently toward the bottom 51b of the upper end 51a. This inclined surface includes a flat surface, as well as an arcuately shaped surface that is formed in an arcuate shape that is concave at the bottom. The size of the step of the front step part 51Fd is df. The size of the step of the rear step part 51Rd is dr. The front and rear step parts 51Fd, 51Rd thus inclined serve to guide the locking pin 52 so as to be readily inserted when inserted into and interlocked with the locking groove 51F on the front end or the locking groove 51R on the rear end.

A case in which the front and rear step parts 51Fd, 51Rd are not present on the front surface 51Fw and the rear surface 51Rw (where the sizes of the steps is such that df=0 and dr=0) will now be considered. A state will be considered in which the operating button 54c (FIG. 4) is pushed continuously, whereby the locking pin 52 is separated from all of the locking grooves 51. The linking member 25 is displaced forward in this state, whereby the upper end 51a (aperture 51a) of the locking groove 51R on the rear end is positioned directly below the locking pin 52 displayed by the imaginary lines in FIG. 13. Once the linking member 25 has been completely displaced forward, the locking pin 52 will enter into and interlock with the locking groove 51R on the rear end when the operating button 54c is no longer pushed.

Figure 16:
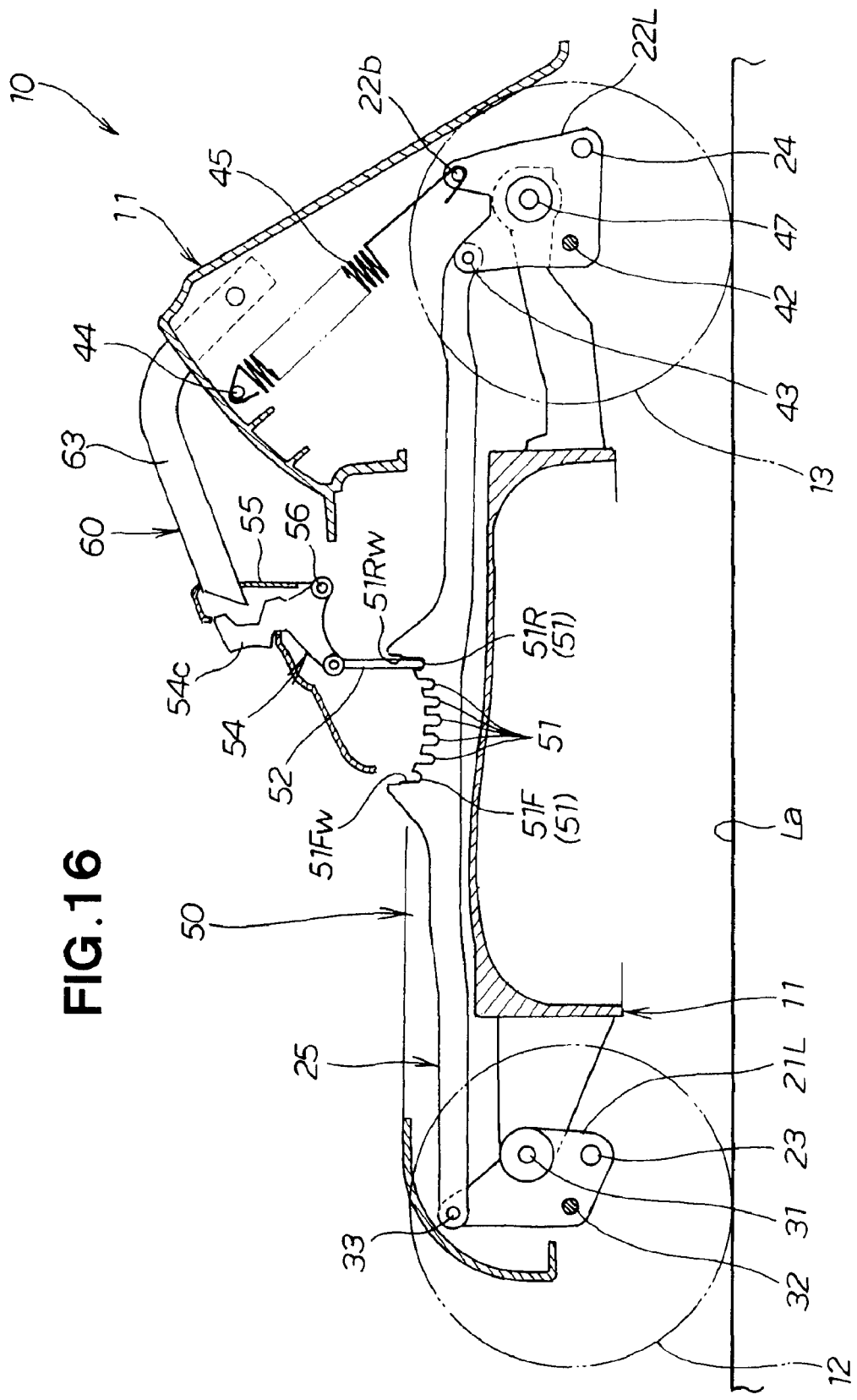
FIG. 16 is a lateral cross-sectional view showing the height adjusting mechanism and the height adjusting grip of FIG. 4 as the height of the housing above the ground is at a maximum.

However, the rear wheel-supporting member 22L is linked to the housing 11 via the spring 45, as shown in FIG. 4. The spring 45 is an urging member for easing the lifting force when the operator Mn (FIG. 12) lifts up the housing 11. The direction of the urging of the spring 45 is substantially coincident with the direction for lifting up the housing 11 using the height adjusting grip 60. The housing 11 is at the maximum height above the ground when the housing 11 is lifted up to the maximum, as shown in FIG. 16. The urging force of the spring 45 decreases as the housing 11 is lifted up and is very small in a state in which the housing 11 is near the maximum height above the ground.

In general, the operator Mn may vigorously lift up the housing 11 in a single burst when purposefully lifting the housing to the maximum height above the ground. The speed at which the spring 45 compresses tends to be slightly slower than the speed at which the operator Mn lifts upward when the housing 11 is near the maximum height above the ground.

The operator Mn therefore lifts up the housing 11 to the maximum height above the ground, and the finger Fg of the hand Ha leaves the operating button 54c, whereby the rear surface 51Rw of the locking groove 51R on the rear end may hit the locking pin 52 from behind slightly after the locking pin 52 has descended. In other words, when the operating button 54c ceases to be pushed (when locking suddenly occurs) before the linking member 25 has finished being displaced forward, it can be understood that the rear surface 51Rw will hit the locking pin 52, which is still sliding toward the locking groove 51R on the rear end. In other words, the rear surface 51Rw will hit the locking pin 52. The locking pin 52 can be displaced slightly in the forward-and-backward direction and will therefore be displaced forward. Phenomena in which the locking pin 52 enters the locking groove 51 in front of the locking groove 51R on the rear end, i.e., "tooth-jumping," are preferably able to be limited even in such instances.

The direction of pushing when the operator Mn pushes the housing 11 downward in a state in which the housing 11 is at the maximum height above the ground, as shown in FIG. 16, is opposite to the urging direction of the spring 45. In other words, the operator Mn pushes the housing 11 against the urging force of the spring 45. The speed at which the spring 45 returns to its original state is therefore substantially equal to the speed at which the operator Mn pushes down. Therefore, tooth-jumping does not occur even when the operator Mn pushes the housing 11 down to the minimum height above the ground, and the finger Fg of the hand Ha leaves the operating button 54c, thereby causing the locking pin 52 to descend.

In consideration of the above, the rear surface 51Rw has the step part 51Rd in the present embodiment. The locking pin 52 that is in the process of sliding toward the locking groove 51R on the rear end when a locking operation suddenly occurs accordingly contacts the succeeding inclined step part 51Rd. As a result, the locking pin 52 is guided by the succeeding step part 51Rd and thereby readily enters into and interlocks with the locking groove 51R on the rear end. The locking pin 52 can therefore be more readily and reliably interlocked with the locking groove 51R on the rear end.

The urging force of the spring 45 is set so that the pushing force is not excessive when the operator Mn pushes down the housing 11. In other words, the urging force of the spring 45 is set so that the lifting force when the operator Mn lifts up the housing 11 and the pushing force when the operator Mn pushes down the housing 11 are at optimal values with respect to balancing these two forces.

The following may occur when, e.g., the urging force of the spring 45 is set to be small. Specifically, when the operator Mn in a single burst vigorously pushes down the housing 11 to the minimum height above the ground, the same result may occur as when the housing 11 is in a single burst vigorously lifted up to the maximum height above the ground.

The front and rear step parts 51Fd, 51Rd (FIG. 13) are present on the front surface 51Fw and the rear surface 51Rw in such instances. Due to the presence of the front and rear step parts 51Fd, 51Rd in the front and rear, the relationship between the front step part 51Fd and the locking pin 52 is the same as the relationship between the rear step part 51Rd and the locking pin 52. The locking pin 52 can therefore more readily and more reliably interlock with the locking groove 51F on the front end and the locking groove 51R on the rear end.

As is made clear from the descriptions above, in the present embodiment the inclined step part 51Fd and/or step part 51Rd are present on at least one of the front surface 51Fw on the edge that forms the locking groove 51F on the front end and the rear surface 51Rw on the edge that forms the locking groove 51R on the rear end.

The operation of the height adjusting mechanism 20 and the height adjusting grip 60 of the aforedescribed configuration will be described next. Descriptions will be omitted for the operation of the right front wheel-supporting member 21R, the right rear wheel-supporting member 22R, the forward linking rod 23, and the rear linking rod 24 shown in FIG. 3.

As described above, FIG. 4 shows the height of the housing 11 in relation to the ground La, i.e., the height of the housing 11 above the ground, set to a minimum. The locking pin 52 is interlocked with the locking groove 51F on the front end in such instances, as shown in FIGS. 4 and 8. The adjustment operation of the height adjusting mechanism 20 is therefore in a restricted state.

Figure 15:
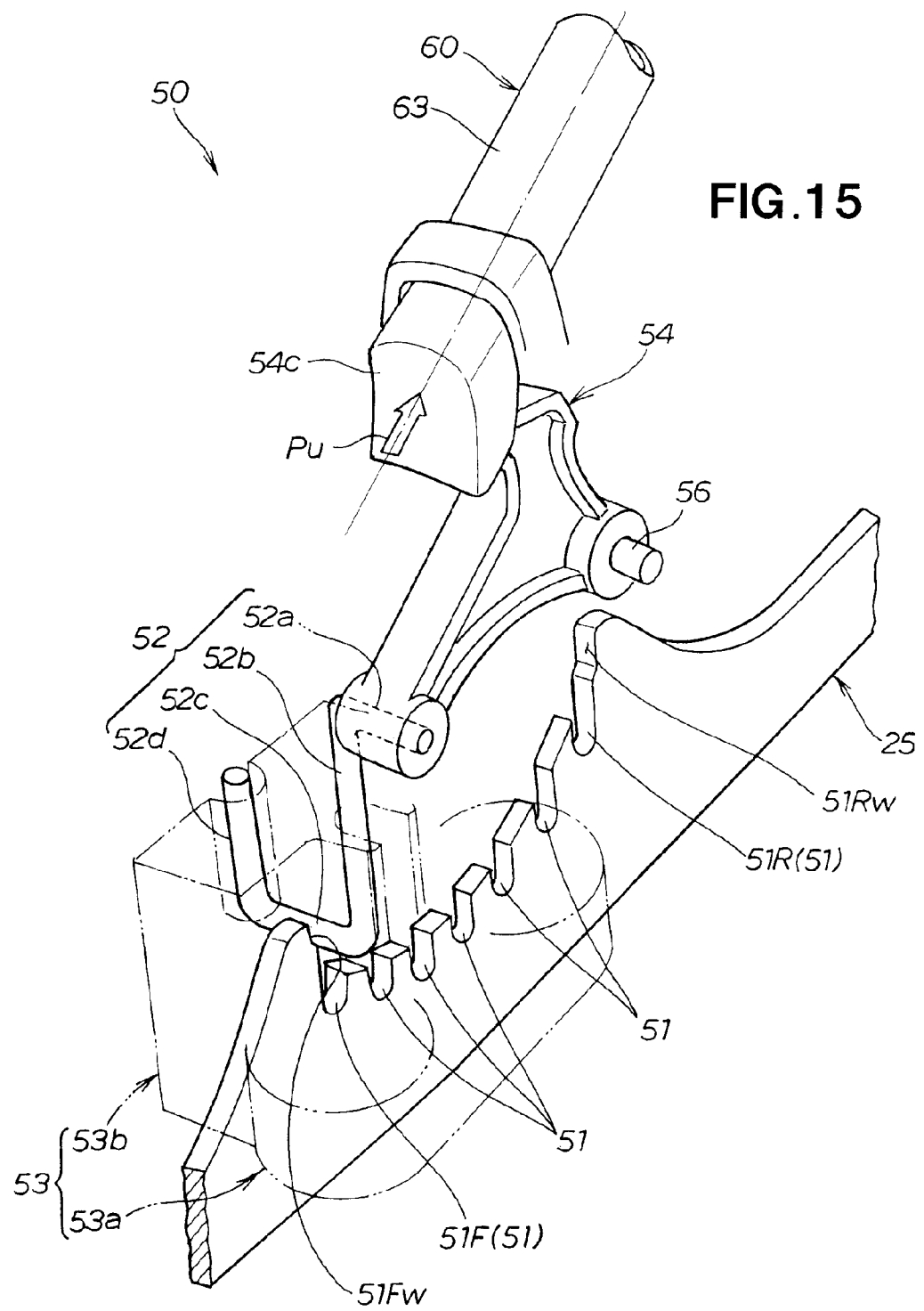
FIG. 15 is a perspective view showing the locking mechanism of FIG. 8 placed in a disassembled state.

The operator Mn uses the thumb Fg of the hand Ha to push the operating button 54c in the pushing direction Pu while using the hand to grasp the height adjusting grip 60, as shown in FIGS. 12A and 12B. The operating member 54 then swings clockwise in FIG. 8 (in the direction of an arrow Cw in FIG. 8) about the supporting pin 56 and causes the locking pin 52 to slide upward, as shown in FIG. 8. As a result, the locking pin 52 separates from the locking groove 51F on the front end, and the height adjusting mechanism 20 is thereby released from the restricted state. This result is shown in FIG. 15.

In the released state, the operator Mn lifts the height adjusting grip 60 up to a desired height while using the thumb Fg of the hand Ha that grasps the height adjusting grip 60 to push the operating button 54c, as shown in FIG. 12A. The housing 11 is lifted up along with the height adjusting grip 60. Therefore, as shown in FIG. 4, the front wheel-supporting member 21L is rotationally displaced in the counterclockwise direction (the direction of an arrow A1) in relation to the axle 32, and the rear wheel-supporting member 22L is rotationally displaced in the counterclockwise direction (the direction of an arrow A2) in relation to the axle 42. At this time, the linking pin 33 of the front wheel-supporting member 21L swings upward (in the direction of the arrow A1), and the linking pin 43 of the rear wheel-supporting member 22L swings upward (in the direction of the arrow A2). The linking member 25 that is linked to the front and rear linking pins 33, 43 moves forward (in the direction of an arrow Af).

The thumb Fg thereafter leaves the operating button 54c (executes the locking operation) as shown by the imaginary lines in FIG. 12B. The operating member 54 automatically swings in the counterclockwise direction in FIG. 8 about the supporting pin 56 and returns to the original neutral position due to the urging force of the urging member 57 (FIG. 9), as shown in FIG. 8. The locking pin 52 is pushed by the operating member 54, slides downward, and inserts into the locking groove 51 that corresponds to the height of the housing 11 above the ground. The locking pin 52 enters into and interlocks with one of the locking grooves 51, whereby the height adjusting mechanism 20 is once again restricted. The operating button 54c is thus locked, whereby the adjusted height of the housing 11 above the ground is maintained. A state in which the housing 11 is at the maximum height above the ground is shown in FIG. 16.

Thereafter, once the operating button 54c is again unlocked, the height adjusting grip 60 can be moved downward, whereby the height of the housing 11 above the ground can be reduced.

As is made clear from the descriptions above, when the operating member 54 causes the locking pin 52 to slide, the locking pin 52 is guided by the pin-guiding part 53 and enters into or retracts from one of the locking grooves 51. In other words, displacement of the linking member 25 in the forward-and-backward direction is restricted in a state in which the locking pin 52 is interlocked with one of the locking grooves 51. Swinging motion of the front and rear wheel-supporting members 21L, 22L is therefore restricted, and the height of the housing 11 and the blade 14 relative to the ground La therefore cannot be adjusted. The operator Mn thereafter uses the operating member 54 to slide the locking pin 52, and displacement of the linking member 25 in the forward-and-backward direction is permitted upon separation from the locking groove 51. Since swinging of the front and rear wheel-supporting members 21L, 22L is therefore permitted, the height of the housing 11 and the blade 14 in relation to the ground La can be adjusted. After adjusting the height, the locking pin 52 is once again operated so as to interlock with one of the locking grooves 51, whereby displacement of the linking member 25 in the forward-and-backward direction is restricted.

The pin-guiding part 53 thus slidably guides the locking pin 52 only in a direction for entering into or retracting from one of the locking grooves 51 aligned in a row from front to rear on the linking member 25. The locking pin 52 can therefore be made to reliably enter into and retract from one of the locking grooves 51 irrespective of the operational state of the operating member 54 or the state of displacement of the linking member 25.

Since the pin-guiding part 53 slidably guides the locking pin 52 only in a direction for entering into or retracting from one of the locking grooves 51, as described above, the array pitch Pi and the groove width Gw of the locking grooves 51 can be readily set to optimal values. Setting the array pitch Pi and the groove width Gw to optimal values allows the locking pin 52 to be reliably inserted into and retracted from the locking grooves 51. As a result, the operational reliability of the height adjusting mechanism 20 can be increased.

The array pitch Pi and the groove width Gw are set to optimal values so as to resist the effects of dust, whereby the durability of the locking grooves 51 and the locking pin 52 can be increased. As a result, the durability of the height adjusting mechanism 20 can be increased.

The pin-guiding part 53 can slidably guide the locking pin 52 in a consistent manner. The locking pin 52 can be made to slide irrespective of the operational format (pushing, sliding, or the like) of the operating member 54. The operating member 54 can therefore be selected to have high operability according to the type and size of the lawnmower 10. As a result, the operability of the height adjusting mechanism 20 can be increased.

Figure 17:
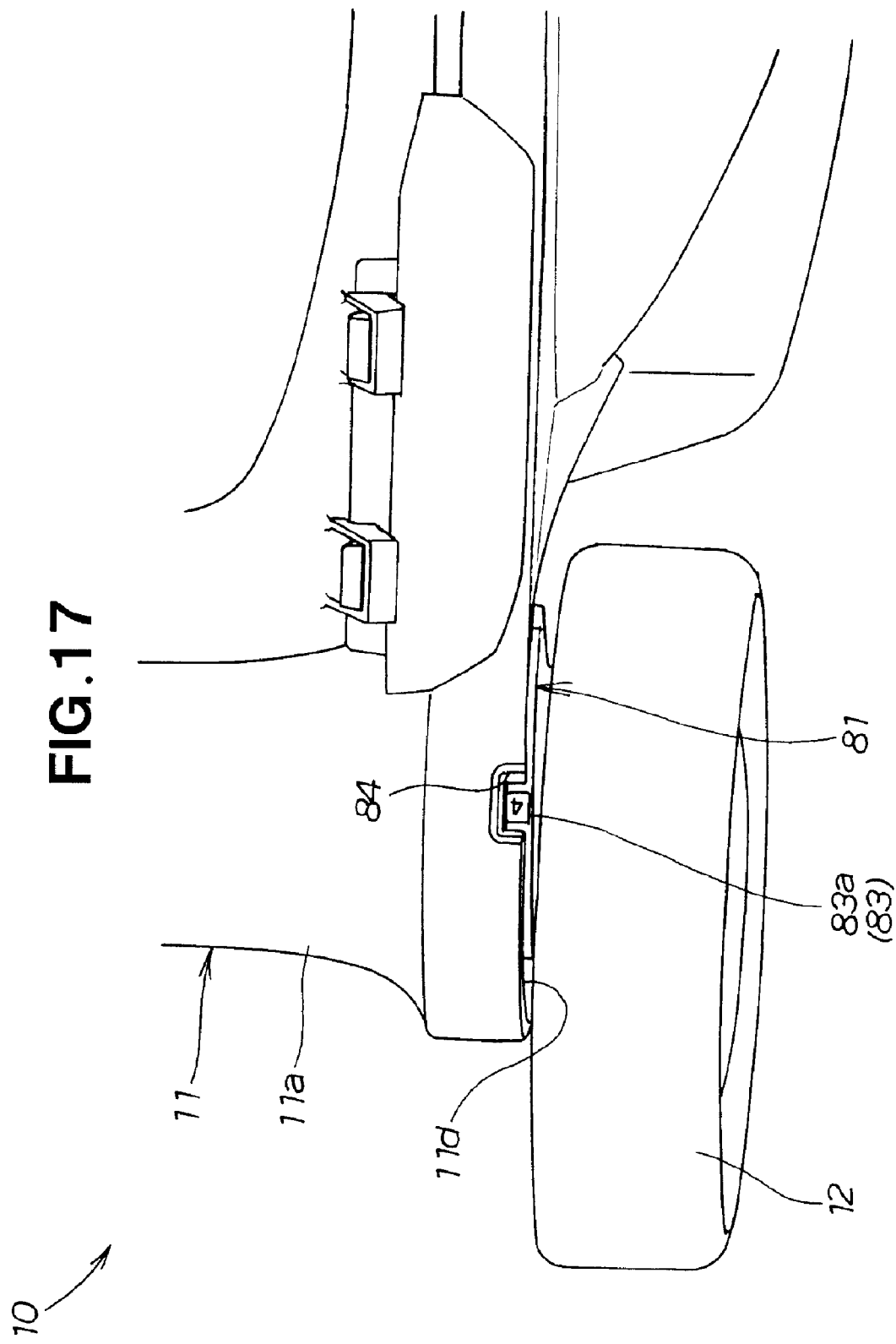
FIG. 17 is a schematic view showing an arcuate part and a peephole positioned on a front left part of the housing of FIG. 1.
Figure 18:
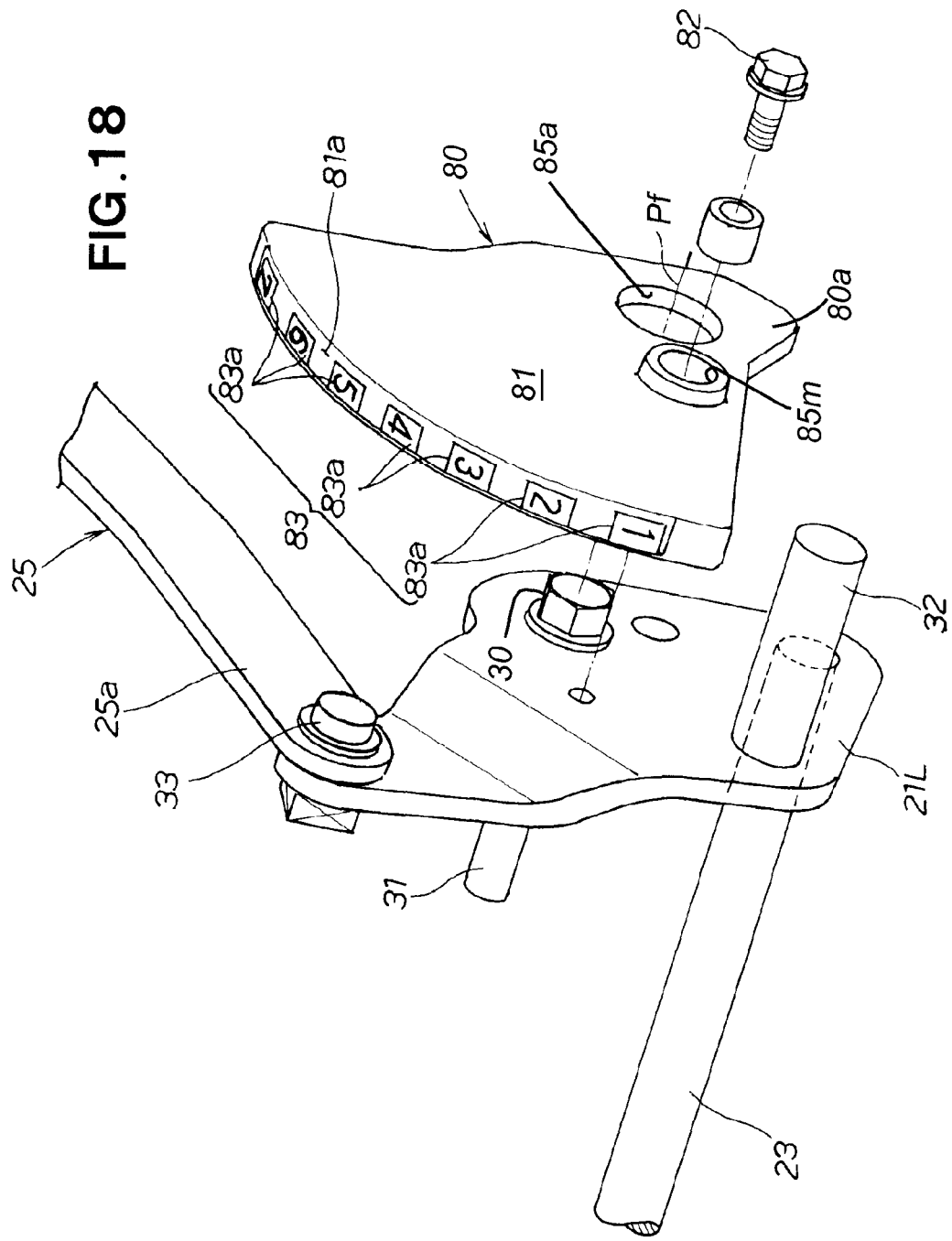
FIG. 18 is an exploded view illustrating a relationship of the arcuate part with respect to a left front wheel-supporting member of FIG. 3.
Figure 19:
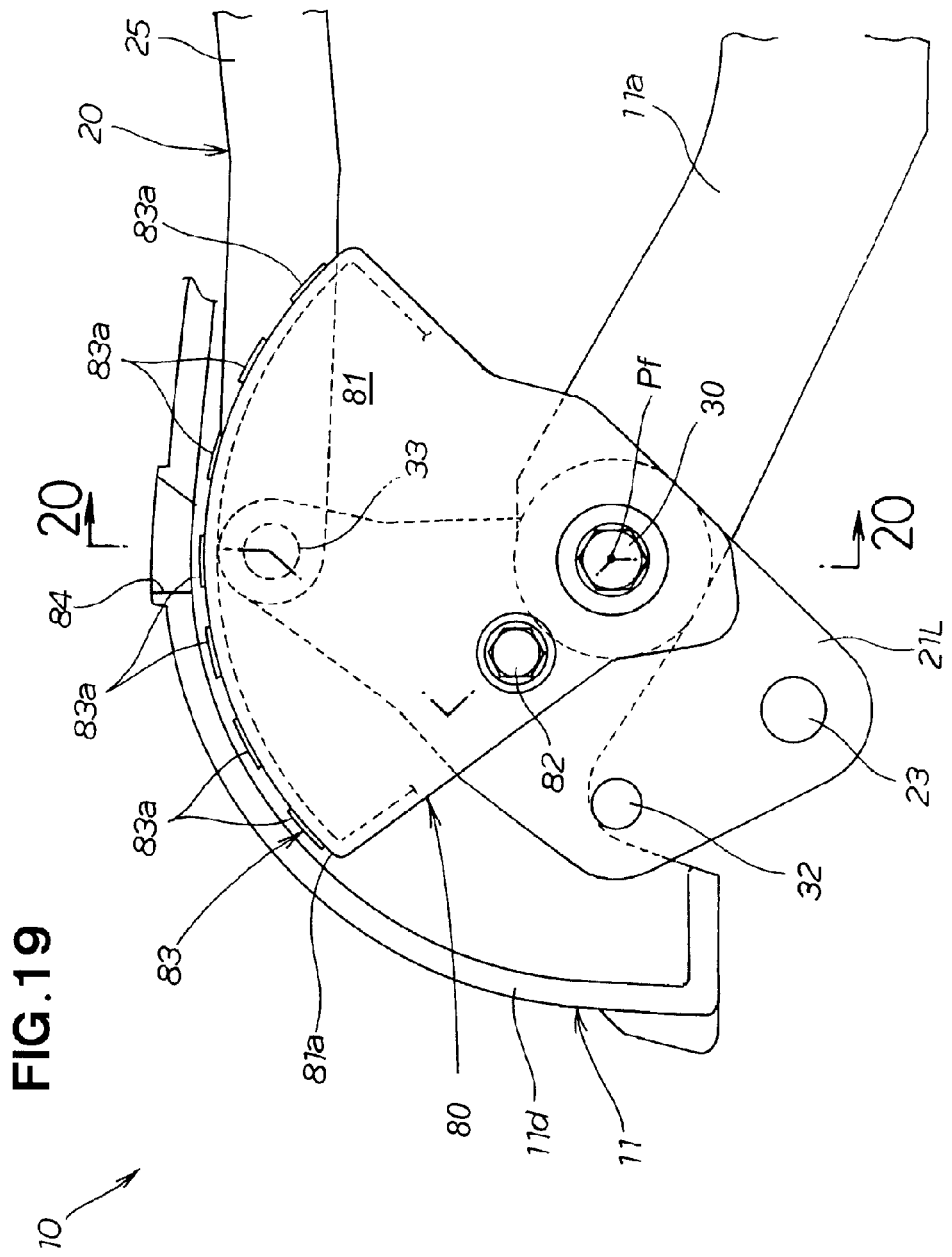
FIG. 19 is a lateral view showing the front left part of the housing, the arcuate part, and the peephole of FIG. 17, as viewed from sideways.
Figure 20:
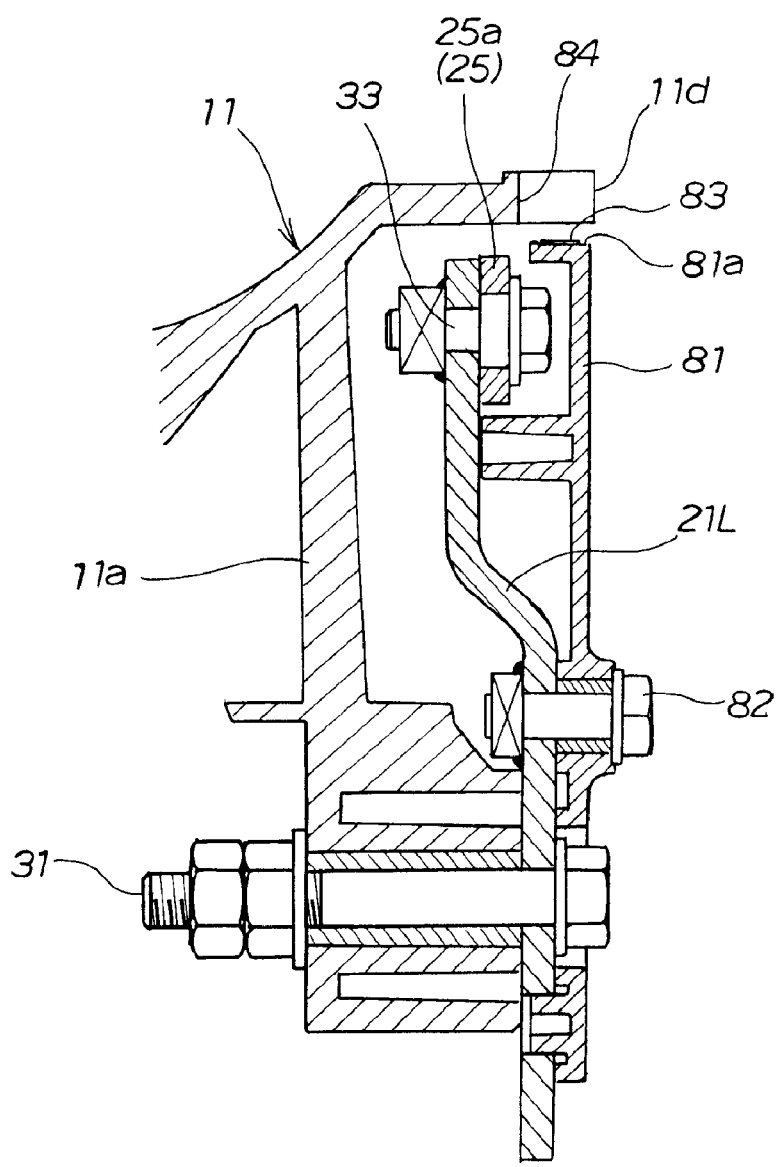
FIG. 20 is a cross-sectional view taken along line 20-20 of FIG. 19.

In the depicted embodiment shown in FIGS. 17-20, the front part 11a of the housing 11 has a rectangular cutaway notch formed in an outer side edge portion thereof adjacent the wheel 12, and the notch defines a peephole 84. The left front wheel-supporting member 21L is provided with a height-indicating member 80 attached thereto, including a base portion 80a having a mounting hole 85m formed therein to receive a mounting bolt 82, and also having an alignment hole 85a formed therein to receive a head of a fastener 30, which is attached to the supporting shaft 31 which supports the wheel-supporting member 21L thereon, as shown. The height-indicating member 80 also includes an arcuate part 81 which is integrally formed with the base portion 80a, as shown in FIGS. 18 through 19. The arcuate part 81 is attached to the plate surface (lateral surface) of the left front wheel-supporting member 21L by a bolt 82 and can thereby pivotally slide up and down along with the front wheel-supporting member 21L. The arcuate part 81 has a fanned-out shape when the lawnmower 10 is viewed from the side and has an arcuately shaped outer circumferential surface 81a formed on an upper edge portion thereof and centered on a center Pf, around which the front wheel-supporting member 21L swings up and down relative to the housing 11. The outer circumferential surface 81a is positioned further to the inside in the widthwise direction of the housing 11 than an outer side edge portion 11d, and the outer circumferential surface has a display part 83. The display part 83 displays indicia 83a representing the currently applicable height, i.e., the height above the ground, of the housing 11 and the blade 14 (FIG. 1).As shown in FIG. 17, the lawn mower 10 is configured so that a selected one of the indicia representing the current height is visible through the peephole 84 formed in the outer side edge portion 11d of the housing 11.

The display format of the display part 83 is set so as to change according to the amount that the arcuate part 81 swings together with the front wheel-supporting member 21L. The display part 83 is composed of a grouping of a plurality of scale-display patterns 83a that match the number of the locking grooves 51, as shown in, e.g., FIG. 17. The scale-display patterns 83a is aligned at an equal pitch in the circumferential direction with respect to the outer circumferential surface 81a. The scale-display patterns 83a may also have display strips applied to the outer circumferential surface 81a, the display strips bearing numbers (e.g., "1" through "7") or markings.

The housing 11 has a peephole 84 that allows viewing of the display part 83. The peephole 84 is positioned in the vicinity of the linking pin 33 that links the linking member 25 to the front wheel-supporting member 21L. The peephole is composed of a notch part or a through hole that is formed in a part of the housing 11. The size of the peephole 84 is set so as to allow viewing of only one of the scale-display patterns 83a.

The scale-display patterns 83a is displaced according to the swinging motion of the front wheel-supporting member 21L. Only one of the scale-display patterns 83a is visible through the peephole 84. The operator views the display part 83 from above through the peephole 84 and can thereby readily and accurately verify the height of the housing 11 and the blade 14 (FIG. 1) above the ground.

Since the configuration is such that the outer circumferential surface 81a of the arcuate part 81 provided to the front wheel-supporting member 21L has the display part 83, the distance to the display part 83 from the peephole 84 is constant even when the linking member 25 is displaced in the up and down direction. The ease of viewing the display part 83 through the peephole 84 can be adequately ensured.

This simple configuration is such that the outer circumferential surface 81a of the arcuate part 81 provided to the front wheel-supporting member 21L has the display part 83, and the housing 11 has the peephole 84 that allows viewing of the display part 83. The simple configuration thus enables a structure for displaying the height of the housing 11 and the blade 14.

The outer circumferential surface 81a of the arcuate part 81 is positioned further to the inside in the widthwise direction of the housing 11 than the end 11d, and the outer circumferential surface 81a therefore does not protrude to the outside of the end 11d in the widthwise direction of the housing 11. Extra space therefore need not be provided to the lawnmower 10 for positioning the arcuate part 81.

The walk-behind lawnmower 10 in the present invention is not limited to lawnmowers that are self-propelled by an engine 15 or another drive source; lawnmowers that are propelled by motive force or manpower are possible.

The arcuate part 81 that has the display part 83 may be provided to either of the front and rear wheel-supporting members 21L, 22L. A configuration is also possible in which the arcuate part 81 is integrally formed with either of the front and rear wheel-supporting members 21L, 22L.

The walk-behind lawnmower of the present invention is ideally applied to rotary lawnmowers.

Obviously, various minor changes and modifications of the present invention are possible in light of the above teaching. It is therefore to be understood that within the scope of the appended claims the invention may be practiced otherwise than as specifically described.

What is claimed is:

1. A walk-behind lawnmower designed to travel under motor power or manpower while cutting grass, the walk-behind lawnmower comprising:
   a housing;
   a blade, housed within the housing, for cutting away the grass; and
   a height adjusting mechanism for adjusting a height of the housing and the blade with respect to the ground,
   wherein the height adjusting mechanism includes:
      front wheel supporting members, linked vertically swingably to a front part of the housing, for supporting front wheels;
      rear wheel supporting members, linked vertically swingably to a rear part of the housing, for supporting rear wheels;
      a linking member for linking together the front wheel supporting members and the rear wheel supporting members so as to enable the front wheel supporting members and the rear wheel supporting members to move in an interlocked manner, the linking member being displaceable in a forward-and-backward direction and in a vertical direction in correspondence with swinging movements of the front wheel supporting members and the rear wheel supporting members; and a locking mechanism for restricting and releasing the displacement of the linking member in the forward-and-backward direction, the locking mechanism including:

a plurality of locking grooves formed in a row from front to rear on the linking member;

a locking pin capable of selectively interlocking with one of the locking grooves, the locking pin being substantially J-shaped and comprising a link-receiving part at an upper end thereof, a first perpendicular part that extends downwardly from the link-receiving part, a horizontal interlocking part that extends laterally from the lower end of the first perpendicular part, and a second perpendicular part that extends upwardly from the interlocking part;

a pin-guiding part, provided to the housing, for slide-guiding the locking pin in an entry-retraction direction with respect to one of the grooves; and an operating member, provided to the housing, for slide-operating the locking pin.

2. The lawnmower of claim 1, wherein each of the locking grooves comprises a U-shaped groove with an upper end sloping downward from an upper-end surface of the linking member, and the upper-end surface of the linking member comprises an arcuate surface formed in a concave arcuate shape across a portion at which the upper ends of the locking grooves are positioned, the arcuate shape corresponding to a displacement track of the linking member in the forward-and-backward and vertical directions.

3. The lawnmower of claim 2, wherein the linking member has front and rear spaced apart vertical projections extending upwardly thereon at an intermediate portion thereof, each of the vertical projections including an inner wall, wherein the inner wall of the front vertical projection faces toward the inner wall of the rear vertical projection, and wherein at least one of the inner walls of said front and rear spaced apart vertical projections defines a pin-contacting surface on an edge portion of one of the locking grooves, and comprises a stepped part sloping upwardly at a region above the pin-contacting surface.

4. The lawnmower of claim 1, wherein the housing has a notch formed in outer side edge portion thereof adjacent one of the wheels, the notch forming a peephole, and further comprising a height-indicating member attached to one of said wheel-supporting members proximate said notch, the height-indicating member having an arcuately shaped outer circumferential surface formed on an upper edge portion thereof and having a plurality of indicia thereon, wherein a selected one of said indicia is visible through the peephole formed in the outer side edge portion of the housing.

5. The lawnmower of claim 4, wherein the base portion of the height-indicating member has a mounting hole formed therein to receive a bolt.

6. The lawnmower of claim 1, wherein the linking member has front and rear spaced apart vertical projections extending upwardly thereon at an intermediate portion thereof, each of the vertical projections including an inner wall, wherein the inner wall of the front vertical projection faces toward the inner wall of the rear vertical projection, and wherein at least one of the inner walls of said front and rear spaced apart vertical projections defines a pin-contacting surface on an edge portion of one of the locking grooves, and comprises a stepped part sloping upwardly at a region above the pin-contacting surface.

7. The lawnmower of claim 1, wherein the pin-guiding part comprises a base portion and a guiding portion that is formed integrally on the base portion, the guiding portion having a first guide groove formed substantially vertically therein for receiving the first perpendicular part of the locking pin, a second groove formed substantially vertically therein on a side opposite the first guide groove for receiving the second perpendicular part of the guide pin, and a third guide groove formed substantially horizontally therein and extending between the first guide groove and the second guide groove to allow passage of the interlocking part.

8. A walk-behind lawnmower designed to travel under motor power or manpower while cutting grass, the walk-behind lawnmower comprising:

a housing having a notch formed in outer side edge portion thereof, the notch defining a peephole;

a blade, housed within the housing, for cutting away the grass; and a height adjusting mechanism for adjusting a height of the housing and the blade with respect to the ground, wherein the height adjusting mechanism includes:

front wheel supporting members, linked vertically swingably to a front part of the housing, for supporting front wheels;

rear wheel supporting members, linked vertically swingably to a rear part of the housing, for supporting rear wheels;

a height-indicating member attached to one of said wheel-supporting members proximate said notch, the height-indicating member having an arcuately shaped outer circumferential surface formed on an upper edge portion thereof and having a plurality of indicia thereon, wherein a selected one of said indicia is visible through the peephole formed in the outer side edge portion of the housing;

a linking member for linking together the front wheel supporting members and the rear wheel supporting members so as to enable the front wheel supporting members and the rear wheel supporting members to move in an interlocked manner, the linking member being displaceable in a forward-and-backward direction and in a vertical direction in correspondence with swinging movements of the front wheel supporting members and the rear wheel supporting members; and a locking mechanism for restricting and releasing the displacement of the linking member in the forward-and-backward direction, the locking mechanism including:

a plurality of locking grooves formed in a row from front to rear on the linking member;

a locking pin capable of selectively interlocking with one of the locking grooves;

a pin-guiding part, provided to the housing, for slide-guiding the locking pin in an entry-retraction direction with respect to one of the grooves; and an operating member, provided to the housing, for slide-operating the locking pin.

9. The lawnmower of claim 8, wherein each of the locking grooves comprises a U-shaped groove with an upper end sloping downward from an upper-end surface of the linking member, and the upper-end surface of the linking member comprises an arcuate surface formed in a concave arcuate shape across a portion thereof at which the upper ends of the locking grooves are positioned, the arcuate shape corresponding to a displacement track of the linking member in the forward-and-backward and vertical directions.

10. The lawnmower of claim 8, wherein the locking pin is substantially J-shaped and comprises a link-receiving part at an upper end thereof, a first perpendicular part that extends downwardly from the link-receiving part, a horizontal interlocking part that extends laterally from the lower end of the first perpendicular part, and a second perpendicular part that extends upwardly from the interlocking part.

11. The lawnmower of claim 10, wherein the pin-guiding part comprises a base portion and a guiding portion that is formed integrally on the base portion, the guiding portion having a first guide groove formed substantially vertically therein for receiving the first perpendicular part of the locking pin, a second groove formed substantially vertically therein on a side opposite the first guide groove for receiving the second perpendicular part of the guide pin, and a third guide groove formed substantially horizontally therein and extending between the first guide groove and the second guide groove to allow passage of the interlocking part.

12. The lawnmower of claim 8, wherein the height-indicating member comprises a base portion having a mounting hole formed therein to receive a bolt.

13. The lawnmower of claim 8, wherein the linking member has front and rear spaced apart vertical projections extending upwardly thereon at an intermediate portion thereof, each of the vertical projections including an inner wall, wherein the inner wall of the front vertical projection faces toward the inner wall of the rear vertical projection, and wherein at least one of the inner walls of said front and rear spaced apart vertical projections defines a pin-contacting surface on an edge portion of one of the locking grooves, and comprises a stepped part sloping upwardly at a region above the pin-contacting surface.

14. The lawnmower of claim 9, wherein the linking member has front and rear spaced apart vertical projections extending upwardly thereon at an intermediate portion thereof, each of the vertical projections including an inner wall, wherein the inner wall of the front vertical projection faces toward the inner wall of the rear vertical projection, and wherein at least one of the inner walls of said front and rear spaced apart vertical projections defines a pin-contacting surface on an edge portion of one of the locking grooves, and comprises a stepped part sloping upwardly at a region above the pin-contacting surface.

15. A walk-behind lawnmower designed to travel under motor power or manpower while cutting grass, the walk-behind lawnmower comprising:
a housing;
a blade, housed within the housing, for cutting away the grass; and
a height adjusting mechanism for adjusting a height of the housing and the blade with respect to the ground,
wherein the height adjusting mechanism includes:
    front wheel supporting members, linked vertically swingably to a front part of the housing, for supporting front wheels;
    rear wheel supporting members, linked vertically swingably to a rear part of the housing, for supporting rear wheels;
    a linking member for linking together the front wheel supporting members and the rear wheel supporting members so as to enable the front wheel supporting members and the rear wheel supporting members to move in an interlocked manner, the linking member being displaceable in a forward-and-backward direction and in a vertical direction in correspondence with swinging movements of the front wheel supporting members and the rear wheel supporting members; and
    a locking mechanism for restricting and releasing the displacement of the linking member in the forward-and-backward direction, the locking mechanism including:
a plurality of locking grooves formed in a row from front to rear on the linking member;
a locking pin capable of selectively interlocking with one of the locking grooves, the locking pin being substantially J-shaped and comprising a link-receiving part at an upper end thereof, a first perpendicular part that extends downwardly from the link-receiving part, a horizontal interlocking part that extends laterally from the lower end of the first perpendicular part, and a second perpendicular part that extends upwardly from the interlocking part;
a pin-guiding part, provided to the housing, for slide-guiding the locking pin in an entry-retraction direction with respect to one of the grooves, the pin-guiding part comprising a base portion and a guiding portion that is formed integrally on the base portion, the guiding portion having a first guide groove formed substantially vertically therein for receiving the first perpendicular part of the locking pin, a second groove formed substantially vertically therein on a side opposite the first guide groove for receiving the second perpendicular part of the guide pin, and a third guide groove formed substantially horizontally therein and extending between the first guide groove and the second guide groove to allow passage of the interlocking part; and
an operating member, provided to the housing, for slide-operating the locking pin.

16. The lawnmower of claim 15, wherein the housing has a notch formed in outer side edge portion thereof adjacent one of the wheels, the notch forming a peephole, and further comprising a height-indicating member attached to one of said wheel-supporting members proximate said notch, the height-indicating member having an arcuately shaped outer circumferential surface formed on an upper edge portion thereof and having a plurality of indicia thereon, wherein a selected one of said indicia is visible through the peephole formed in the outer side edge portion of the housing.

17. The lawnmower of claim 15, wherein the linking member has front and rear spaced apart vertical projections extending upwardly thereon at an intermediate portion thereof, each of the vertical projections including an inner wall, wherein the inner wall of the front vertical projection faces toward the inner wall of the rear vertical projection, and wherein at least one of the inner walls of said front and rear spaced apart vertical projections defines a pin-contacting surface on an edge portion of one of the locking grooves, and comprises a stepped part sloping upwardly at a region above the pin-contacting surface.

* * * * *